United States Patent
Pearson et al.

(10) Patent No.: US 11,560,968 B2
(45) Date of Patent: Jan. 24, 2023

(54) BLEED VALVE WITH REDUCED NOISE

(71) Applicant: HONEYWELL INTERNATIONAL INC., Morris Plains, NJ (US)

(72) Inventors: John Taylor Pearson, Phoenix, AZ (US); William B. Schuster, Phoenix, AZ (US); Morris G. Anderson, Mesa, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 99 days.

(21) Appl. No.: 16/803,019

(22) Filed: Feb. 27, 2020

(65) Prior Publication Data

US 2021/0270388 A1 Sep. 2, 2021

(51) Int. Cl.
*F16K 47/08* (2006.01)

(52) U.S. Cl.
CPC .................................. *F16K 47/08* (2013.01)

(58) Field of Classification Search
CPC ........................................................ F16K 47/08
USPC ........................................................ 251/127
See application file for complete search history.

(56) References Cited

U.S. PATENT DOCUMENTS

| | | | |
|---|---|---|---|
| 6,887,046 B2 | 5/2005 | Repple et al. | |
| 7,555,905 B2 | 7/2009 | Borcea | |
| 8,128,347 B2 | 3/2012 | Sokhey | |
| 8,578,719 B2 | 11/2013 | Kirby | |
| 9,175,577 B2 | 11/2015 | Papamoschou et al. | |
| 9,784,184 B2 | 10/2017 | Marocchini et al. | |
| 9,964,114 B2* | 5/2018 | Taylor-Tibbott | F02C 9/18 |
| 10,208,676 B2 | 2/2019 | Johnson et al. | |
| 10,215,193 B2 | 2/2019 | Scovell et al. | |
| 10,428,971 B1 | 10/2019 | DeFelice | |
| 2005/0067218 A1* | 3/2005 | Bristow | F01D 17/105 |
| | | | 181/254 |
| 2011/0167834 A1 | 7/2011 | Britchford et al. | |
| 2016/0130972 A1 | 5/2016 | Kozuch et al. | |
| 2019/0277194 A1 | 9/2019 | DeFelice et al. | |

(Continued)

FOREIGN PATENT DOCUMENTS

| | | |
|---|---|---|
| EP | 1728992 A2 | 12/2006 |
| EP | 3354951 A2 | 8/2018 |
| GB | 2405666 A | 3/2005 |

OTHER PUBLICATIONS

Parker Hannifin Corp, "Turbofan Bleed Valve Noise Characterization and Suppression," 2012.

(Continued)

*Primary Examiner* — Angelisa L. Hicks
(74) *Attorney, Agent, or Firm* — Lorenz & Kopf, LLP

(57) ABSTRACT

A bleed valve for a gas turbine engine includes a housing that defines an inlet upstream from an outlet. The bleed valve includes a poppet movable relative to the housing between a first position, in which the poppet closes the inlet, and a second position, in which the inlet is open and configured to receive a fluid flow. The housing defines a tortuous path for the fluid flow from the inlet to the outlet configured to reduce a pressure of the fluid flow from the inlet to the outlet within the housing. The tortuous path is defined by a plurality of rings positioned about the poppet, with each ring of the plurality of rings spaced apart from an adjacent ring of the plurality of rings between the inlet and the outlet to define the tortuous path.

18 Claims, 17 Drawing Sheets

(56) References Cited

U.S. PATENT DOCUMENTS

2019/0309647 A1  10/2019  Caratge
2019/0309762 A1  10/2019  Caratge

OTHER PUBLICATIONS

Phong, Vincent, et al., "Noise Reduction of a Turbofan Bleed Valve," 50th AIAA Aerospace Sciences Meeting Including the New Horizons Forum and Aerospace Exposition Jan. 9-12, 2012.

* cited by examiner

BLEED VALVE WITH REDUCED NOISE

TECHNICAL FIELD

The present disclosure generally relates to gas turbine engines, and more particularly relates to a bleed valve for use with a gas turbine engine with reduced noise during operation.

BACKGROUND

Gas turbine engines may be employed to power various devices. For example, a gas turbine engine may be employed to power a mobile platform, such as an aircraft. Generally, gas turbine engines include one or more compressors contained within a compressor section of the gas turbine engine, which operate to draw air into the gas turbine engine and to raise a pressure of that air. In certain instances, high pressure air generated by the compressors may need to be vented from the compressor section due to the operating conditions of the gas turbine engine. The venting of the high pressure air from the compressor section, however, may result in undesirable noise due to mixing of high pressure compressor air with lower pressure air in the fan bypass duct. In certain operating conditions, such as low power, when the aircraft is on approach to landing or on the ground, the undesirable noise generated by the venting of the high pressure air may be disruptive to residents near the airport, ground crew, etc.

Accordingly, it is desirable to provide a bleed valve for venting high pressure air that reduces a noise generated by the venting of the high pressure air. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a bleed valve for a gas turbine engine. The bleed valve includes a housing that defines an inlet upstream from an outlet. The bleed valve includes a poppet movable relative to the housing between a first position, in which the poppet closes the inlet, and a second position, in which the inlet is open and configured to receive a fluid flow. The housing defines a tortuous path for the fluid flow from the inlet to the outlet configured to reduce a pressure of the fluid flow from the inlet to the outlet within the housing. The tortuous path is defined by a plurality of rings positioned about the poppet, with each ring of the plurality of rings spaced apart from an adjacent ring of the plurality of rings between the inlet and the outlet to define the tortuous path.

Each ring of the plurality of rings includes a terminal segment that defines a terminal end, and the terminal segment is angled relative to a direction of fluid flow through the housing. The terminal segment includes a plurality of serrations. The bleed valve includes at least one swirl vane coupled within the housing downstream of the inlet. The at least one swirl vane is coupled within the housing at an angle relative to a central axis that extends through the housing. The at least one swirl vane is coupled between a valve body associated with the poppet and a first ring of the plurality of rings. The bleed valve includes at least one second swirl vane coupled within the housing downstream of the inlet. The at least one second swirl vane is coupled within the housing at the angle relative to the central axis that extends through the housing. The at least one second swirl vane is coupled between a third ring and a fourth ring of the plurality of rings. Each ring of the plurality of rings is positioned concentrically about a valve body associated with the poppet. A first ring and a second ring of the plurality of rings are defined on an interior surface of the housing and face a third ring and a fourth ring of the plurality of rings. The bleed valve includes a central plate defining a bore. The third ring and the fourth ring of the plurality of rings are defined on the central plate and the poppet includes a valve body that is movable relative to the bore. The bleed valve includes at least one swirl vane defined on the central plate between the bore and the third ring. The bleed valve includes at least one second swirl vane defined between the first ring and the second ring.

Further provided is a bleed valve for a gas turbine engine. The bleed valve includes a housing that defines an inlet upstream from an outlet. The bleed valve includes a poppet movable relative to the housing between a first position, in which the poppet closes the inlet, and a second position, in which the inlet is open and configured to receive a fluid flow. The housing defines a tortuous path for the fluid flow from the inlet to the outlet configured to reduce a pressure of the fluid flow from the inlet to the outlet within the housing. The tortuous path is defined by a plurality of rings positioned about the poppet. Each ring of the plurality of rings is spaced apart from an adjacent ring of the plurality of rings between the inlet and the outlet to define the tortuous path. Each ring of the plurality of rings has a terminal segment that defines a terminal end and the terminal segment is angled in a direction of fluid flow through the housing.

The terminal segment includes a plurality of serrations. Each ring of the plurality of rings is positioned concentrically about a valve body associated with the poppet. A first ring and a second ring of the plurality of rings are defined on an interior surface of the housing and face a third ring and a fourth ring of the plurality of rings. The bleed valve includes a central plate defining a bore. The third ring and the fourth ring of the plurality of rings are defined on the central plate and the poppet includes a valve body that is movable relative to the bore. The bleed valve includes at least one swirl vane defined on the central plate between the bore and the third ring. The bleed valve includes at least one second swirl vane defined between the first ring and the second ring. The at least one swirl vane and the at least one second swirl vane extend at an angle relative to the valve body.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
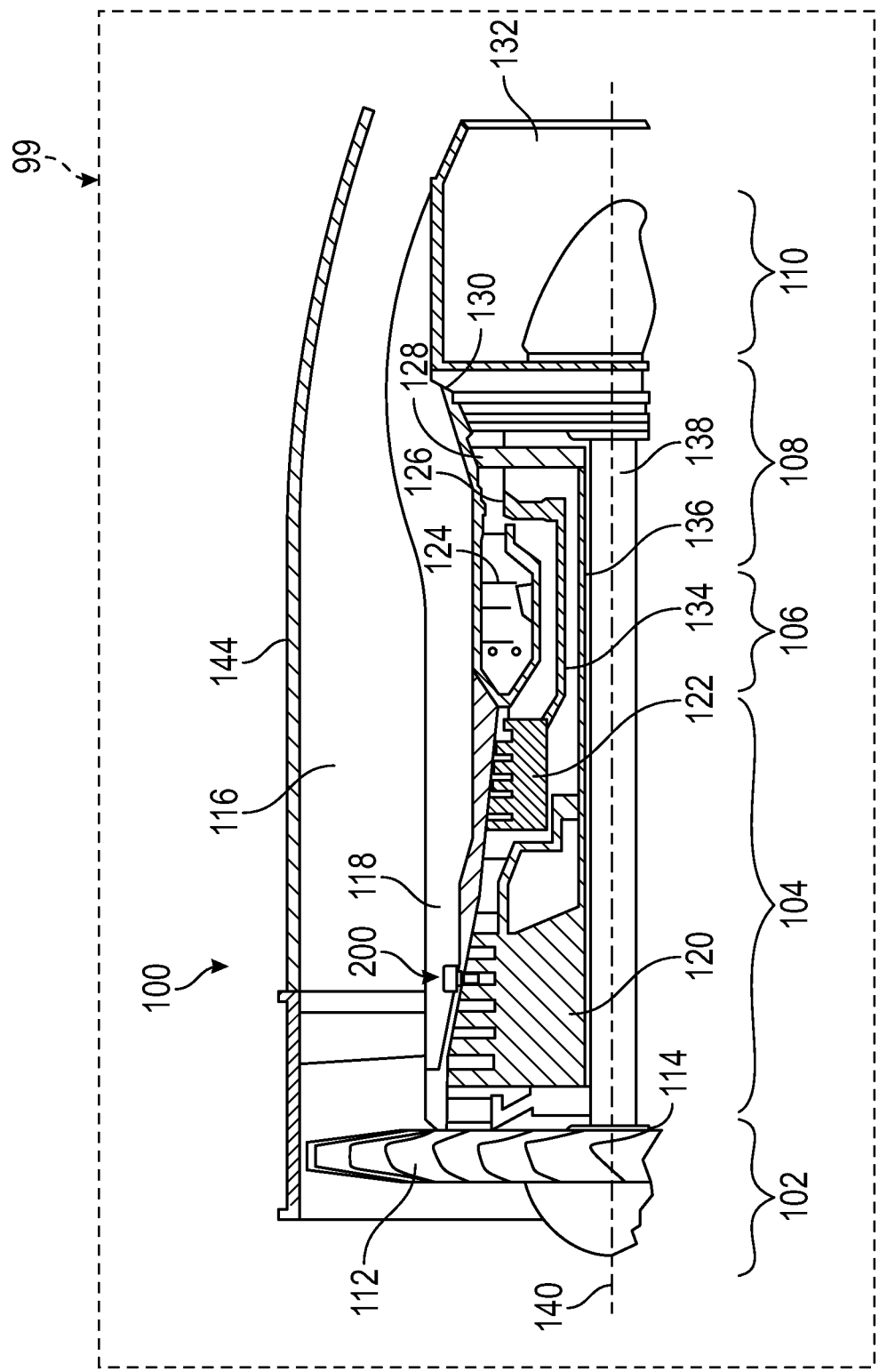
FIG. 1 is a schematic cross-sectional illustration of a gas turbine engine, which includes at least one exemplary bleed valve in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from having a bleed valve with reduced noise, and the gas turbine engine described herein is merely one exemplary embodiment according to the present disclosure. In addition, while the bleed valve is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "transverse" denotes an axis that crosses another axis at an angle such that the axis and the other axis are neither substantially perpendicular nor substantially parallel.

With reference to FIG. 1, a partial, cross-sectional view of an exemplary gas turbine engine 100 is shown with the remaining portion of the gas turbine engine 100 being substantially axisymmetric about a longitudinal axis 140, which also comprises an axis of rotation for the gas turbine engine 100. In the depicted embodiment, the gas turbine engine 100 is an annular multi-spool turbofan gas turbine jet engine within an aircraft 99, although other arrangements and uses may be provided. For example, in other embodiments, the gas turbine engine 100 may assume the form of a non-propulsive engine, such as an Auxiliary Power Unit (APU) deployed onboard the aircraft 99, or an industrial power generator. As will be discussed herein, the gas turbine engine 100 includes at least one bleed valve 200, which enables the venting of high pressure fluid, such as air, from a section of the gas turbine engine 100 with reduced noise. The bleed valve 200 reduces the turbulent kinetic energy levels and reduces peak Mach numbers, which results in reduced mixing noise.

In this example, with continued reference to FIG. 1, the gas turbine engine 100 includes a fan section 102, a compressor section 104, a combustor section 106, a turbine section 108, and an exhaust section 110. In one example, the fan section 102 includes a fan 112 mounted on a rotor 114 that draws air into the gas turbine engine 100 and compresses it. A fraction of the compressed air exhausted from the fan 112 is directed through the outer bypass duct 116 and the remaining fraction of air exhausted from the fan 112 is directed into the compressor section 104. The outer bypass duct 116 is generally defined by an outer casing 144 that is spaced apart from and surrounds an inner bypass duct 118.

In the embodiment of FIG. 1, the compressor section 104 includes one or more compressors 120. The number of compressors in the compressor section 104 and the configuration thereof may vary. The one or more compressors 120 sequentially raise the pressure of the air and direct a majority of the high pressure fluid or air into the combustor section 106. In one example, the compressor section 104 also includes the bleed valve 200. In this example, the bleed valve 200 is coupled or mounted to a compressor case downstream of an axial compressor of the compressors 120. The bleed valve 200 is used to direct a fraction of the compressed air from the compressor section 104 into the outer bypass duct 116. This fraction of air may be used to inhibit a surge of the compressor section 104. It should be noted that the placement of the bleed valve 200 between the compressor section 104 and the outer bypass duct 116 is merely an example, as the bleed valve 200 may be located at any desired position within the gas turbine engine 100. In addition, while a single bleed valve 200 is shown in FIG. 1, the gas turbine engine 100 may include any number of bleed valves 200.

In the embodiment of FIG. 1, in the combustor section 106, which includes a combustion chamber 124, the high pressure air is mixed with fuel and is combusted. The high-temperature combustion air or combustive gas flow is directed into the turbine section 108. In this example, the turbine section 108 includes three turbines disposed in axial flow series, namely, a high pressure turbine 126, an intermediate pressure turbine 128, and a low pressure turbine 130. However, it will be appreciated that the number of turbines, and/or the configurations thereof, may vary. In this embodiment, the high-temperature combusted air from the combustor section 106 expands through and rotates each turbine 126, 128, and 130. The combustive gas flow then exits turbine section 108 for mixture with the cooler bypass airflow from the outer bypass duct 116 and is ultimately discharged from gas turbine engine 100 through exhaust section 132. As the turbines 126, 128, 130 rotate, each drives equipment in the gas turbine engine 100 via concentrically disposed shafts or spools.

Figure 2:
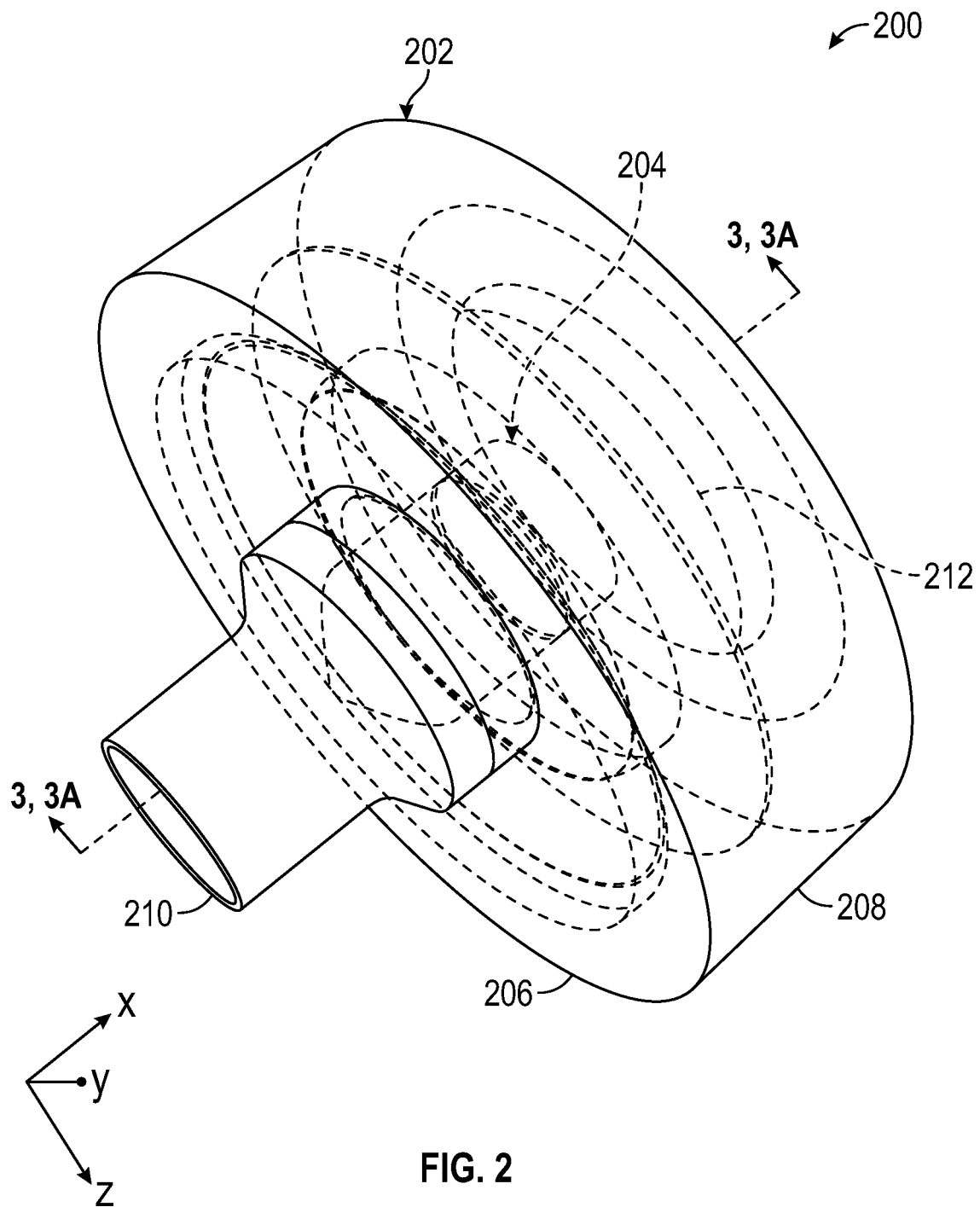
FIG. 2 is a perspective view of the bleed valve of FIG. 1.
Figure 3:
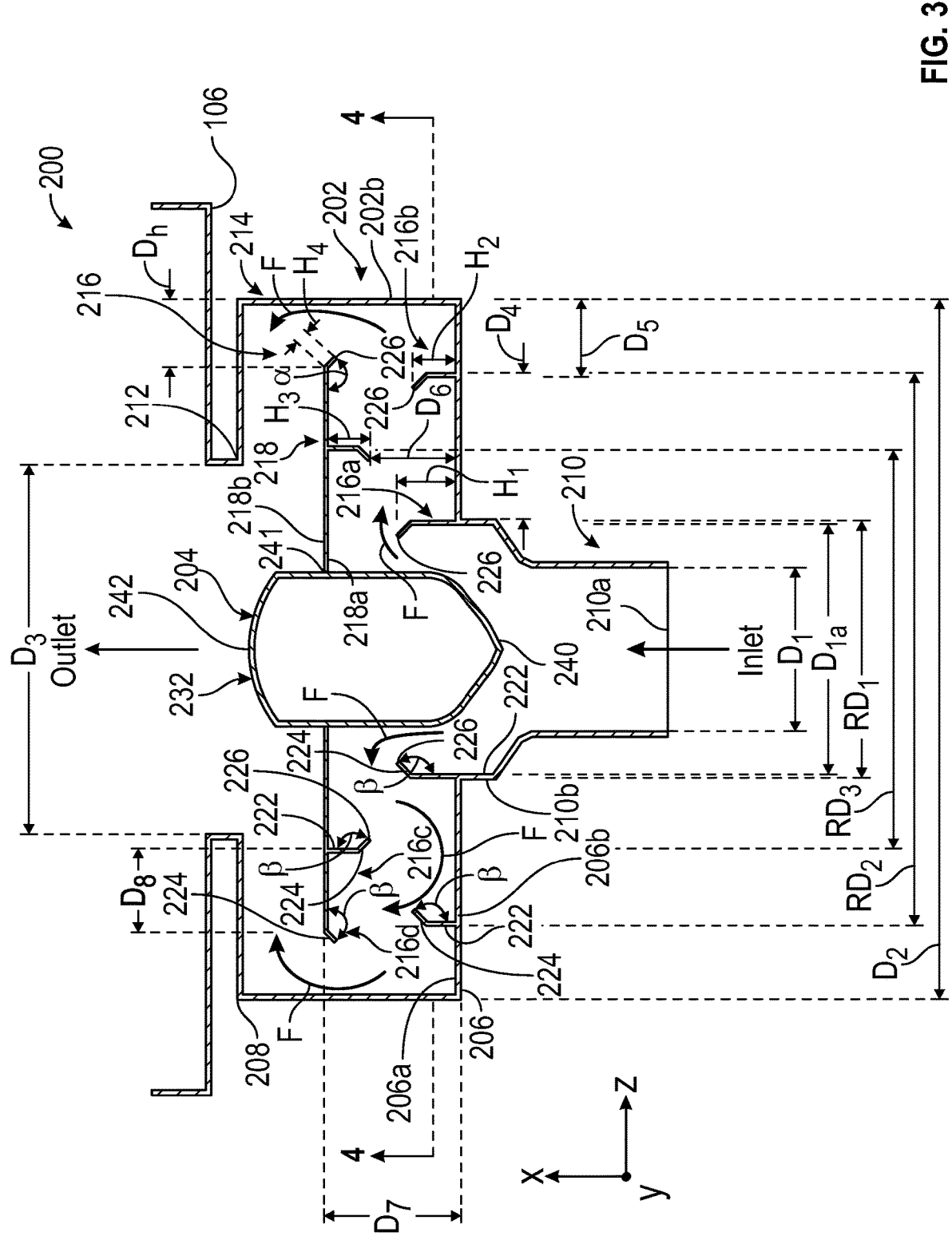
FIG. 3 is a cross-sectional view of the bleed valve of FIG. 2, taken along line 3-3 of FIG. 2.

With reference to FIG. 2, a perspective view of the bleed valve 200 is shown. In one example, the bleed valve 200 includes a housing 202 and a poppet 204. The poppet 204 is movable relative to the housing 202 to move the bleed valve 200 between a first, opened position, in which air is permitted to flow through the bleed valve 200, and a second, closed position, in which air is inhibited from flowing through the bleed valve 200. The housing 202 is composed of a metal or metal alloy, including, but not limited to, aluminum, Inconel, titanium, or steel and may be cast, forged or additively manufactured via direct metal laser sintering (DMLS), etc. In one example, the housing 202 is annular, and tapers from a first side 206 to an opposite second side 208. The first side 206 of the housing 202 includes an inlet 210. In this example, the inlet 210 is fluidly coupled to the compressor section 104 (FIG. 1) to receive the high pressure fluid or air from the compressor section 104 (FIG. 1). In this example, the inlet 210 is cylindrical, and extends outwardly from the first side 206. With reference to FIG. 3, the inlet 210 is illustrated as having a diameter D1 at a first inlet end 210a, which is different, and in this example, less than a diameter D2 of the housing 202. The first inlet end 210a is positioned within the compressor section 104 (FIG. 1) to receive the high pressure air. The diameter D1 of the inlet 210 at the first inlet end 210a is different, and less than, a diameter D1a of a second inlet end 210b. The second inlet end 210b is in fluid communication with the first side 206 of the housing 202. It should be noted that in other embodiments the inlet 210 may be configured differently. The diameter D1a of the inlet 210 is sized to form a seal with an end of the poppet 204 when the poppet 204 is in the first position, as will be discussed.

The second side 208 includes an outlet 212, and thus, the outlet 212 is opposite the inlet 210. The outlet 212 has a diameter D3, which is different, and in this example, less than the diameter D2 of the housing 202. The diameter D3 of the outlet 212 is also different, and in this example, greater than the diameter D1 of the inlet 210. In this example, the outlet 212 is fluidly coupled to the outer bypass duct 116 to exhaust the high pressure air into the outer bypass duct 116. The outlet 212 is circular, and is sized such that an end of a valve body of the poppet 204 does not obstruct the flow of the high pressure air through the bleed valve 200 in the first position or a second position, as will be discussed.

Figure 4:
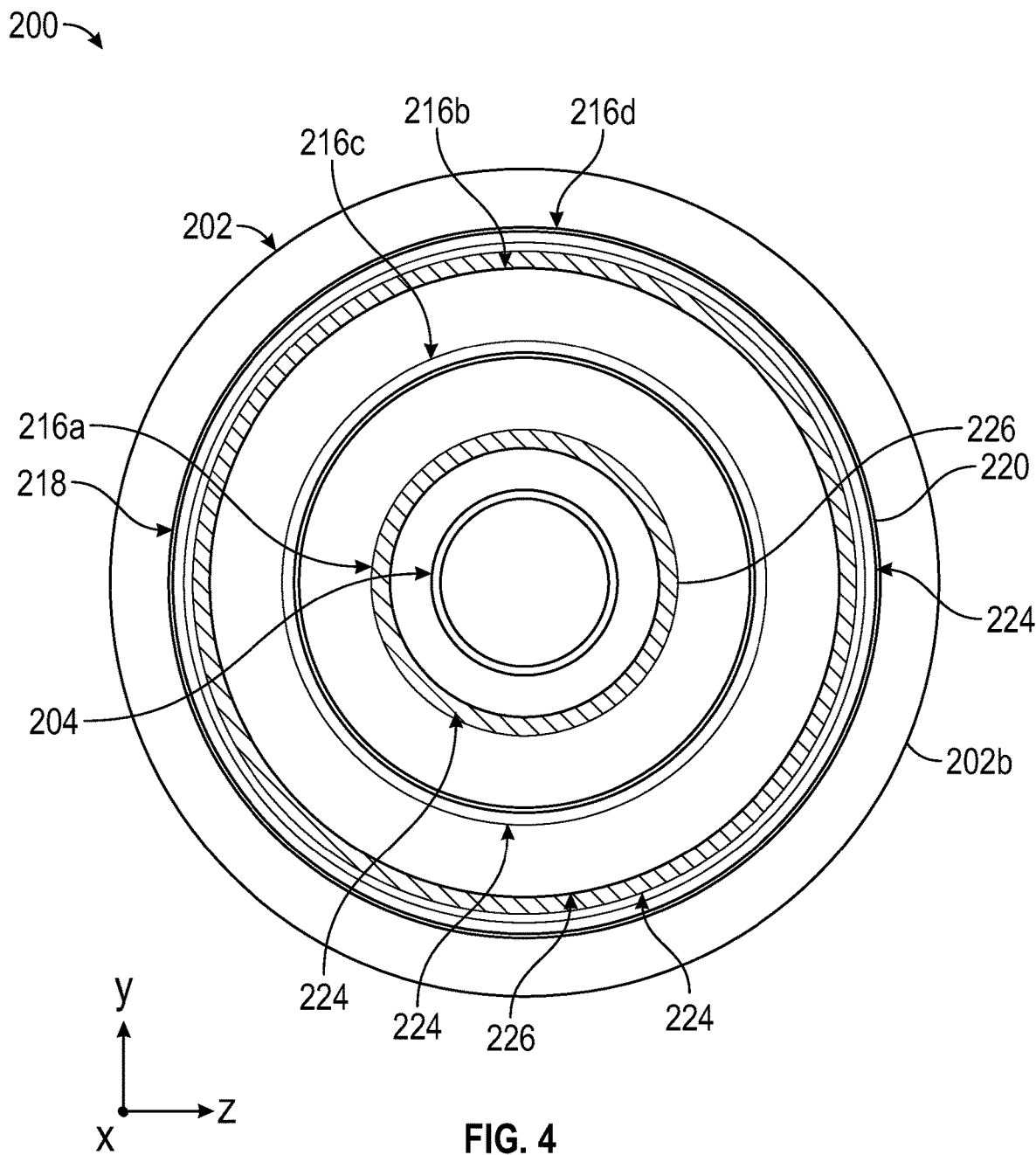
FIG. 4 is a cross-sectional view of the bleed valve of FIG. 2, taken along line 4-4 of FIG. 3.

The housing 202 defines a tortuous path 214 from the inlet 210 to the outlet 212, which reduces a pressure of the high pressure fluid to reduce a noise associated with the release of the fluid through the outlet 212. In one example, the housing 202 includes at least one or a plurality of rings 216, which cooperate to define the tortuous path 214. In this example, the housing 202 includes four rings 216a-216d, which are each concentric with or positioned concentrically about a valve body 232 associated with the poppet 204 (FIG. 4). Each of the rings 216a-216d are spaced apart from each other to define the tortuous path 214. Each of the rings 216a-216d are also offset relative to each other within the housing 202. The first ring 216a and the second ring 216b each face the third ring 216c and the fourth ring 216d. In this example, the first ring 216a is defined about the second inlet end 210b and is concentric about the second inlet end 210b. The first ring 216a is defined to project or extend outwardly from a surface 206a of the first side 206. The surface 206a is an internal surface, and is opposite an external surface 206b. The first ring 216a has a height H1, which is different, and in this example, greater than a height H2 of the second ring 216b. The first ring 216a is spaced apart from the second ring 216b by a distance D4.

The second ring 216b is defined to project or extend outwardly from the surface 206a of the first side 206. The second ring 216b is defined between the first ring 216a and an endwall 202b. The second ring 216b is spaced apart from an endwall 202b of the housing 202 by a distance D5. The distance D5 is different, and in this example, less than the distance D4. The third ring 216c extends outwardly from a surface 218a of a central plate 218 associated with the poppet 204. The central plate 218 is contained wholly within the housing 202. In one example, the central plate 218 is coupled to the housing 202 so as to be fixed relative to the poppet 204, such that the poppet 204 moves relative to and independently of the central plate 218. In this example, the central plate 218 may be suspended by one or more struts that extend between the housing 202 and the central plate 218 as an example. In other embodiments, the central plate 218 may be integrally formed with the poppet 204 so as to move with the poppet 204. The central plate 218 is positioned within the housing 202 between the inlet 210 and the outlet 212. The central plate 218 is annular, and includes the surface 218a, which is opposite a surface 218b. The central plate 218 is concentric with the poppet 204 and defines the bore 241, which enables the poppet 204 to move relative to the central plate 218 to place the bleed valve 200 in the first position, the second position and positions therebetween.

The third ring 216c has a height H3, which is different, and in this example, greater than a height H4 of the fourth ring 216d. The height H3 is different and less than the height H2 of the second ring 216b and the height H1 of the first ring 216a. The third ring 216c is spaced apart from the fourth ring 216d by a distance D8. The third ring 216c is also spaced a distance D6 from the surface 206a of the first side 206. Generally, the third ring 216c has a diameter RD3, which is different and less than a diameter RD2 of the second ring 216b, and different and greater than a diameter RD1 of the first ring 216a.

The fourth ring 216d extends outwardly from the surface 218a of the central plate 218. In one example, the fourth ring 216d is defined at an angle α relative to the surface 218a. In this example, the angle α is about 20 degrees to about 70 degrees. By extending outwardly at the angle α, the air is directed around the fourth ring 216d, which further reduces a pressure of the high pressure fluid. The fourth ring 216d is spaced apart from the surface 206a by a distance D7. The distance D7 is different and greater than the distance D6. As shown in FIG. 4, the diameter RD4 of the fourth ring 216d at a terminal end 226 is different, and greater than, each of the diameters RD1, RD2 and RD3. With reference back to FIG. 3, the different diameters RD1, RD2, RD3, RD4 and the different heights H1, H2, H3 and H4 enables the rings 216a-216d to cooperate to define the tortuous path 214 such that no line of sight is present from the inlet 210 to the outlet 212 when the inlet 210 is opened, and results in the offset between the rings 216a-216d within the housing 202. Generally, the diameters RD1, RD2, RD3, RD4 and the heights H1, H2, H3 and H4 of the rings 216a-216d may be based on the size of the gas turbine engine 100, the location of the bleed valve 200, etc. In one example, the ring 216a has the diameter D1 of about 3.0 inches (in.) to about 4.0 inches (in.) and the height H1 of about 0.80 inches (in.) to about 1.1 inches (in.); the ring 216b has the diameter D2 of about 5.0 inches (in.) to about 6.0 inches (in.) and the height H2 of about 0.50 inches (in.) to about 0.80 inches (in.); the ring 216c has the diameter D3 of about 7.0 inches (in.) to about 8.0 inches (in.) and the height H3 of about 0.60 inches (in.) to about 1.0 inches (in.); and the ring 216d has the diameter D4 of about 8.0 inches (in.) to about 9.0 inches (in.) and the height H4 of about 0.20 inches (in.) to about 0.30 inches (in.). In addition, it should be noted that a particular gas turbine engine 100 may include bleed valves 200 of various sizes.

Figure 3A:
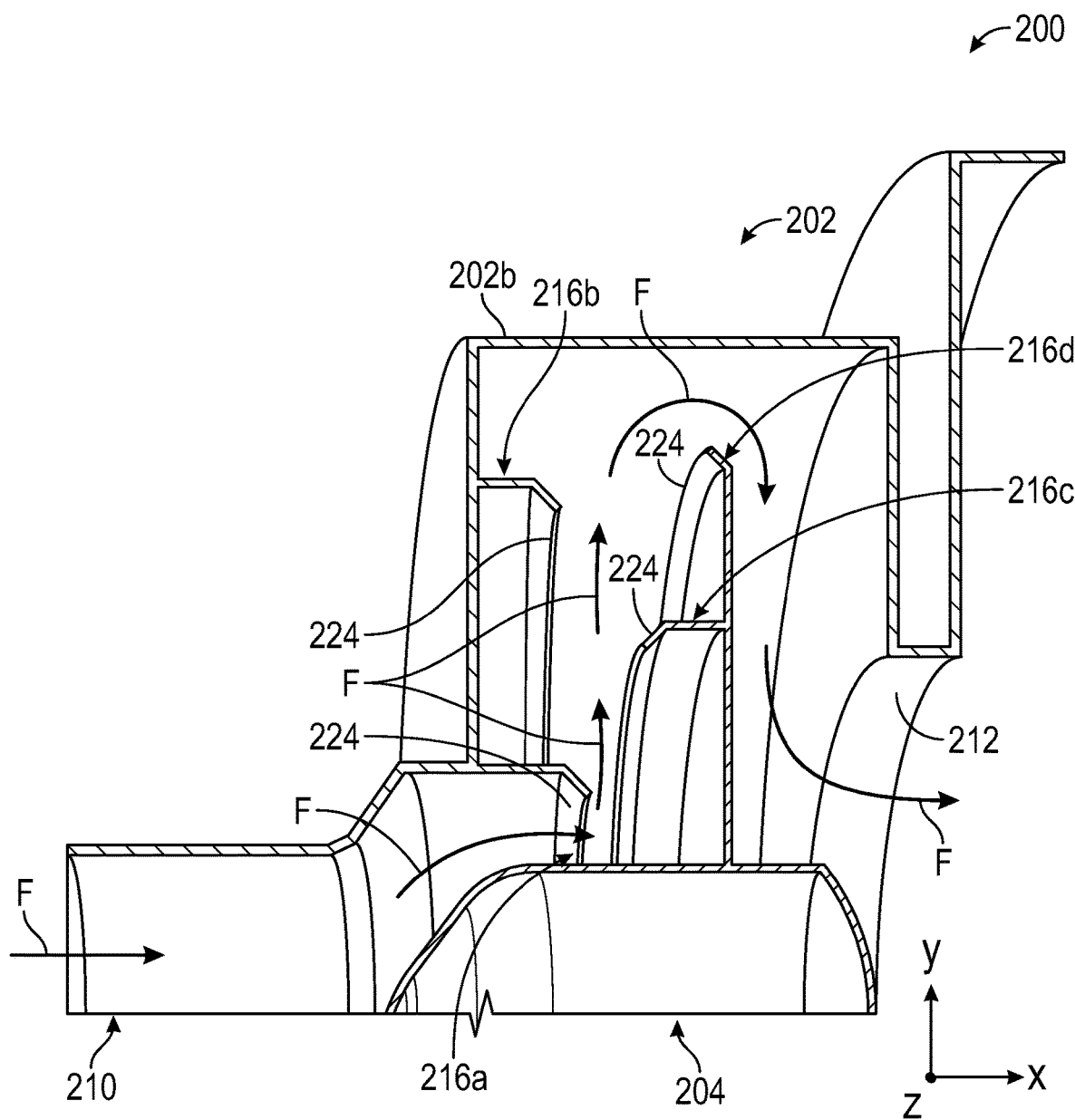
FIG. 3A is a cross-sectional view of the bleed valve of FIG. 2, taken along line 3A-3A of FIG. 2.

In this example, each of the rings 216a-216c include a body segment 222 and a terminal segment 224, and the ring 216d includes the terminal segment 224. The body segment 222 extends from the respective surface 206a, 218a so as to be substantially perpendicular to the respective surface 206a, 218a. The terminal segment 224 of the rings 216a-216c extend from the body segment 222 to a terminal end 226, and the terminal segment 224 of the ring 216d extends from the surface 218a to the terminal end 226. The terminal segment 224 is angled at an angle β relative to the body segment 222 of the rings 216a-216c. In one example, the angle β is about 110 degrees to about 160 degrees. In one example, with reference to FIG. 3A, the terminal segment 224 is angled into a direction of flow F from the inlet 210 to the outlet 212 to reduce the pressure of the air as the flows through the bleed valve 200. Generally, the fourth ring 216d includes the terminal segment 224 and does not include the body segment 222. With reference to FIG. 3, the angle β associated with the terminal segment 224 of the fourth ring 216d is defined between the terminal segment 224 of the fourth ring 216d and the surface 218a of the central plate 218 and is equal to the angle α. It should be noted that in certain embodiments, the terminal segment 224 need not be angled, but rather, may be planar with the body segment 222 for the rings 216a-216c or perpendicular with the central plate 218 for the ring 216d.

Figure 5:
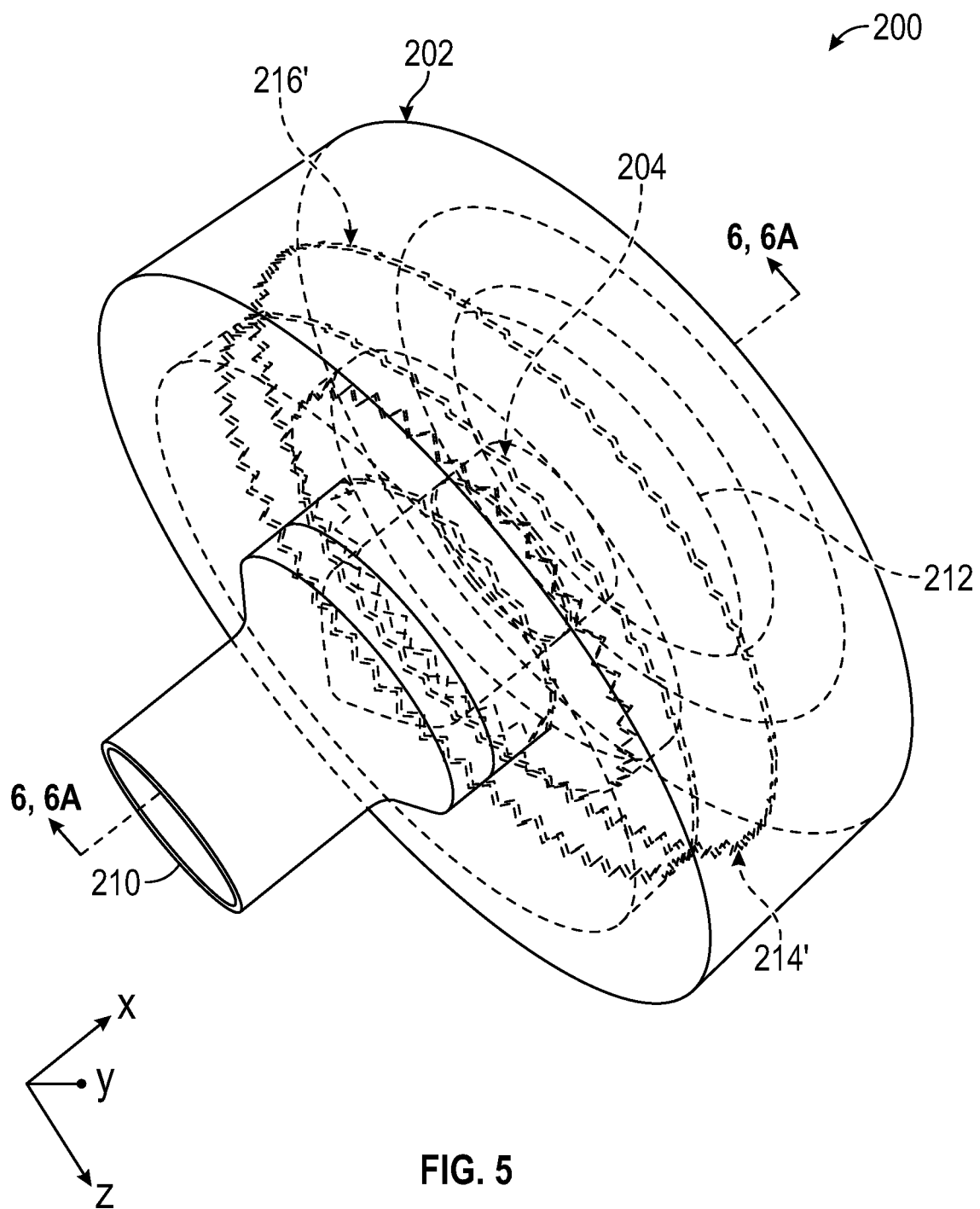
FIG. 5 is a perspective view of another exemplary bleed valve for use with the gas turbine engine of FIG. 1.

Thus, with reference to FIG. 4, each of the rings 216a-216d includes the respective terminal end 226 and the terminal segment 224. In this example, the terminal ends 226 are solid and uniform, however, the terminal ends 226 and/or the terminal segment 224 may include one or more features to reduce the pressure of the air while also reducing noise. For example, with reference to FIG. 5, a plurality of rings 216' is shown for use with the bleed valve 200. In this example, each of the plurality of rings 216' cooperate to define a tortuous path 214' from the inlet 210 to the outlet 212, which reduces a pressure of the high pressure fluid to reduce a noise associated with the release of the fluid through the outlet 212. In this example, with reference to FIG. 6, the housing 202 includes four rings 216a'-216d', which are each concentric with or positioned concentrically about the valve body 232 associated with the poppet 204. Each of the rings 216a'-216d' are spaced apart from each other to define the tortuous path 214'. The first ring 216a' and the second ring 216b' each face the third ring 216c' and the fourth ring 216d'. Each of the rings 216a'-216d' are also offset relative to each other within the housing 202. In this example, the first ring 216a' is defined about the second inlet end 210b' and is concentric about the second inlet end 210b'. The first ring 216a' is defined to project or extend outwardly from the surface 206a of the first side 206. The first ring 216a' has the height H1, which in this example, is about the same as a height H2' of the second ring 216b'. The first ring 216a' is spaced apart from the second ring 216b' by the distance D4.

The second ring 216b' is defined to project or extend outwardly from the surface 206a of the first side 206. The second ring 216b' is defined between the first ring 216a' and an endwall 202b. The second ring 216b' is spaced apart from an endwall 202b of the housing 202 by the distance Dh. The third ring 216c' extends outwardly from the surface 218a of the central plate 218. The third ring 216c' has the height H3, which is different, and in this example, greater than the height H4 of the fourth ring 216d'. The height H3 is different and less than the height H2' of the second ring 216b' and the height H1 of the first ring 216a'. The third ring 216c' is spaced apart from the fourth ring 216d' by the distance D5. The third ring 216c' is also spaced the distance D6 from the surface 206a of the first side 206. Generally, the third ring 216c' has the diameter RD3, which is different and less than the diameter RD2 of the second ring 216b' and different and greater than the diameter RD1 of the first ring 216a'. The fourth ring 216d' is spaced apart from the surface 206a by the distance D7. The diameter RD4 of the fourth ring 216d' at a terminal end 226' is different, and greater than, each of the diameters RD1, RD2 and RD3. The different diameters RD1, RD2, RD3, RD4 and the different heights H1, H2, H3 and H4 enables the rings 216a'-216d' to cooperate to define the tortuous path 214 such that no line of sight is present from the inlet 210 to the outlet 212 when the inlet 210 is opened, and results in the offset between the rings 216a'-216d' within the housing 202.

Figure 6:
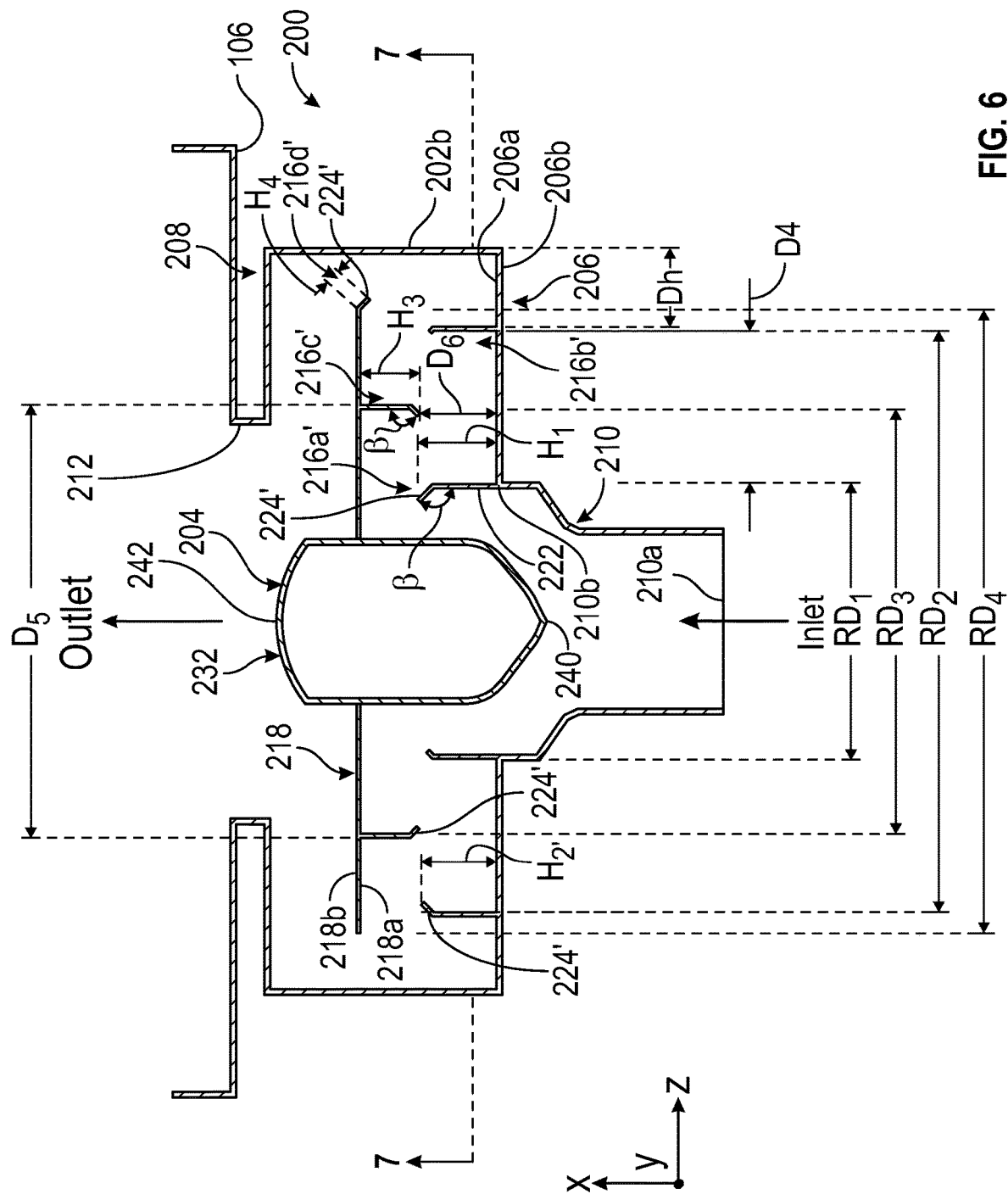
FIG. 6 is a cross-sectional view of the bleed valve of FIG. 5, taken along line 6-6 of FIG. 5.
Figure 6A:
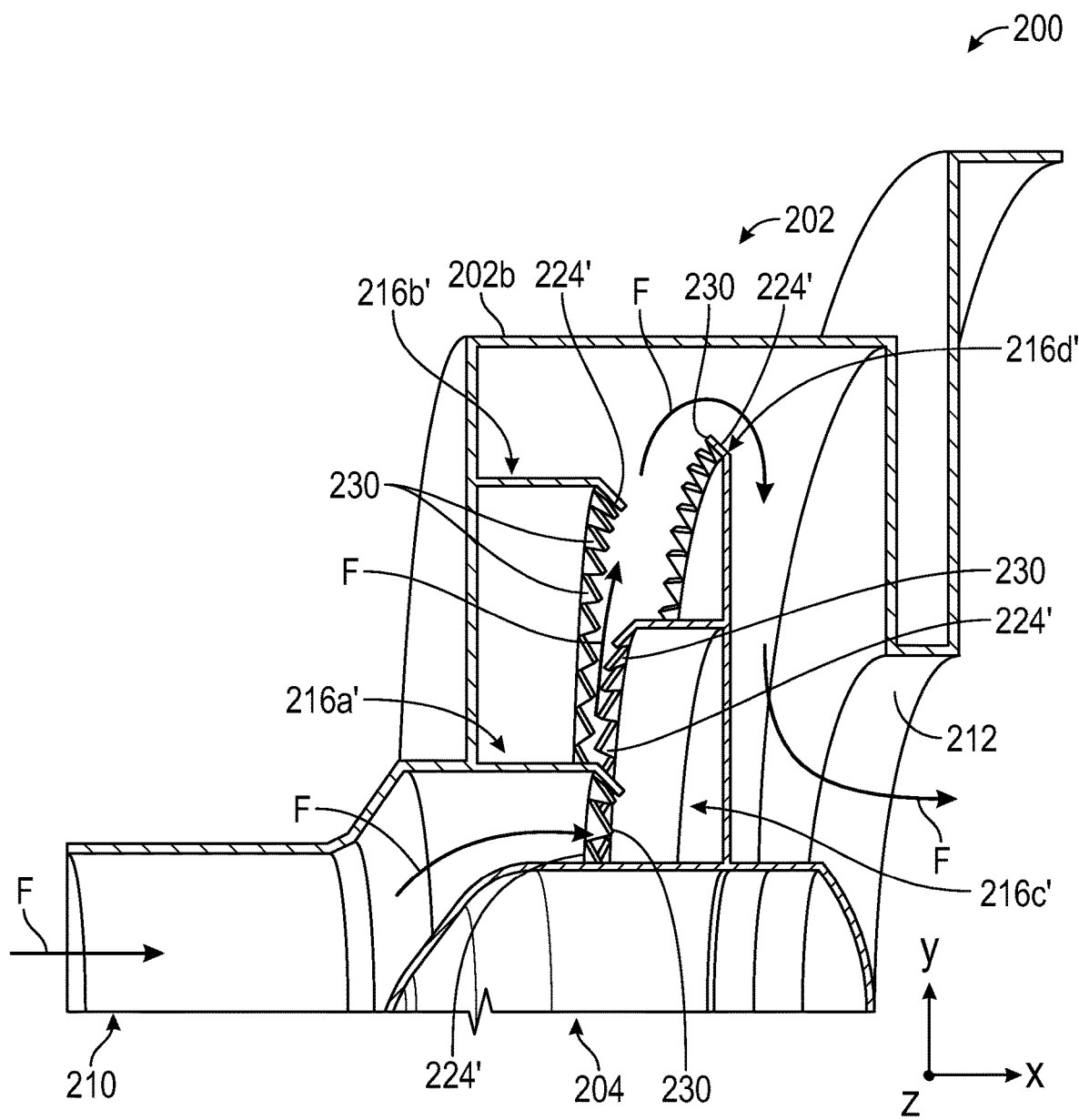
FIG. 6A is a cross-sectional view of the bleed valve of FIG. 5, taken along line 6A-6A of FIG. 5.

In this example, each of the rings 216a'-216c' include the body segment 222 and each of the rings 216a'-216d' include a terminal segment 224'. The terminal segment 224' extends from the body segment 222 of the rings 216a'-216c' or from the surface 218a to a terminal end 226'. The terminal segment 224' is angled at the angle β relative to the body segment 222 of the rings 216a'-216c'. In one example, with reference to FIG. 6A, the terminal segment 224' is angled into a direction of flow F from the inlet 210 to the outlet 212 to reduce the pressure of the air as the flows through the bleed valve 200. Generally, the fourth ring 216d' includes the terminal segment 224' and does not include the body segment 222. With reference to FIG. 6, the angle β associated with the terminal segment 224' of the fourth ring 216d' is defined between the terminal segment 224' of the fourth ring 216d' and the surface 218a of the central plate 218. It should be noted that in certain embodiments, the terminal segment 224' need not be angled, but rather, may be planar with the body segment 222 for the rings 216a'-216c' or perpendicular with the central plate 218 for the ring 216d'.

Figure 7:
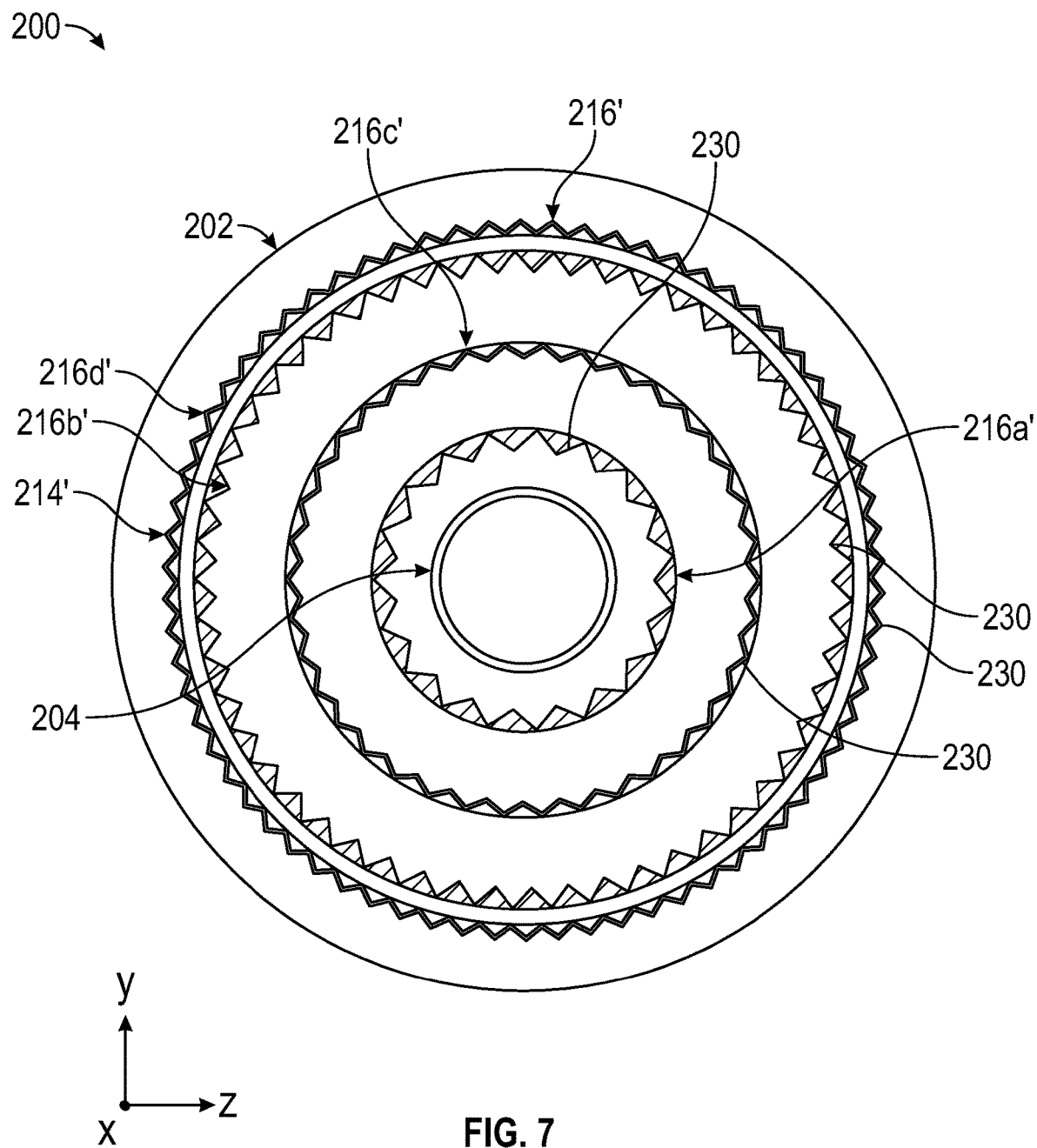
FIG. 7 is a cross-sectional view of the bleed valve of FIG. 5, taken along line 7-7 of FIG. 6.

In this example, with reference to FIG. 7, each of the terminal segments 224' includes a plurality of serrations 230. The plurality of serrations 230 in this example comprise a plurality of triangular teeth, which alternate in a repeating pattern about a perimeter or circumference of each ring 216a'-216d'. It should be noted that although the plurality of serrations 230 are illustrated and described herein as comprising a plurality of triangular teeth in a repeating pattern, the plurality of serrations 230 may have a non-uniform pattern, or may be comprised of different geometrical shapes, such as square or round teeth, etc. The use of the serrations 230 at the terminal ends 226 of the rings 216a'-

216*d'* further reduces the pressure of the high pressure air flowing through the bleed valve 200 by promoting turning, which reduces a noise associated with the air flowing through the outlet 212. In one example, the serrations 230 reduce max turbulent kinetic energy by about 28%, when compared to the rings 216*a*-216*d* that are devoid of the serrations 230. The reduction in the turbulent kinetic energy reduces the amount of noise generated when the air is bled from the bleed valve 200. As turbulent kinetic energy levels correlate strongly with jet mixing noise, a reduction in turbulent kinetic energy levels reduces the noise generated inside the bleed valve 200 by the turbulent mixing of the flow.

With reference back to FIG. 3, the poppet 204 is generally cylindrical, and in this example, is solid. The poppet 204 includes a valve body 232. The poppet 204 is composed of a metal or metal alloy, including, but not limited to aluminum, Inconel, titanium, or steel and may be cast, forged, machined, stamped, additively manufactured through DMLS, etc. As discussed, the poppet 204 is movable relative to the housing 202 between the first position, in which the poppet 204 closes the inlet 210 and the second position in which the poppet 204 opens the inlet 210. Generally, the poppet 204 is movable to positions between the first position and the second position based on a pressure of the high pressure air received from the compressor section 104 (FIG. 1). Thus, in this example, the pressure of the high pressure air moves the poppet 204 between the first position, the second position and positions in-between. The mass of the poppet 204 may be predetermined such that the poppet 204 moves from the first position at a predefined threshold pressure. In other embodiments, the poppet 204 may be electrically coupled to a controller associated with the gas turbine engine 100 (FIG. 1) and responsive to one or more control signals to move between the first position, the second position and positions in-between.

The valve body 232 includes a first body end 240 opposite a second body end 242. The first body end 240 is conical, and forms a seal with the inlet 210 of the housing 202 in the first position. In this example, the conical shape assists with directing flow of the high pressure air into the bleed valve 200. The second body end 242 is rounded, and smooth. The shape of the second body end 242 provides a smooth surface for directing the air from the housing 202 through the outlet 212. It should be noted, however, that the first body end 240 and the second body end 242 may have any desired shape. The valve body 232 is movable relative to the central plate 218 within the bore 241 defined through the central plate 218.

In one example, the housing 202 is formed with the rings 216*a*, 216*b* or 216*a'*, 216*b'*. The poppet 204 is formed, the central plate 218 is formed with the rings 216*c*, 216*d* or 216*c'*, 216*d'* and positioned within the housing 202. The bleed valve 200 is coupled to the gas turbine engine 100 (FIG. 1) such that the inlet 210 is disposed in and fluidly coupled to the compressor section 104 (FIG. 1). During the operation of the gas turbine engine 100, once the pressure of the air within the compressor section 104 (FIG. 1) exceeds the mass of the poppet 204, the poppet 204 moves from the first position, in which the inlet 210 is closed, towards the second position. In the second position, as the air enters into the bleed valve 200, the air flows through the tortuous path 214, 214' defined by the respective plurality of rings 216*a*-216*d*, 216*a'*-216*d'*. As the air flows around the terminal segments 224, 224' and through the tortuous path 214, 214', the pressure of the air is reduced, which reduces a noise associated with the air exiting the bleed valve 200 through the outlet 212. Thus, the bleed valve 200, via the plurality of rings 216*a*-216*d*, 216*a'*-216*d'* that cooperate to define the tortuous path 214, 214', reduces a noise associated with the bleeding of air from the compressor section 104 (FIG. 1) through the bleed valve 200.

Figure 8:
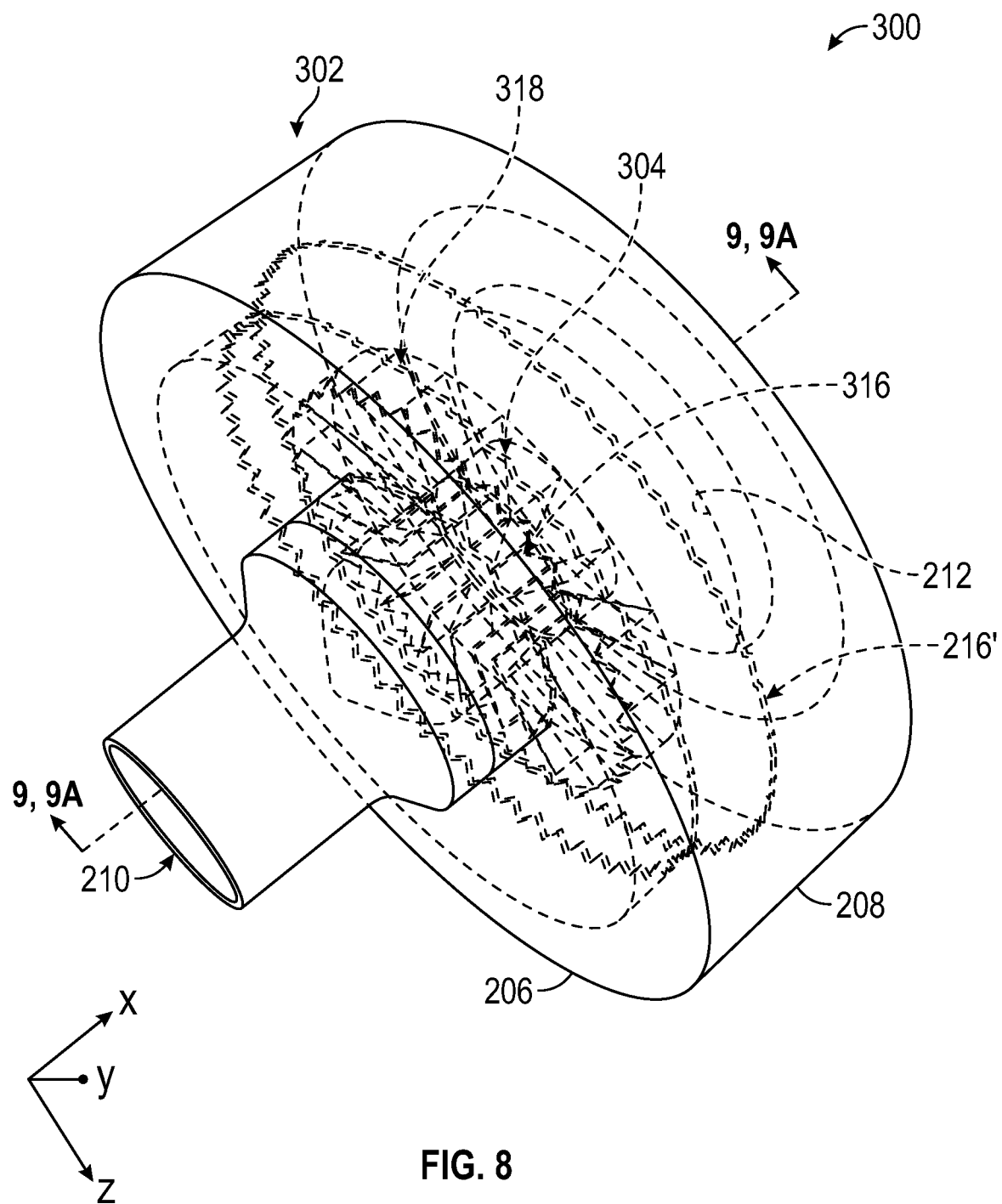
FIG. 8 is a perspective view of another exemplary bleed valve for use with the gas turbine engine of FIG. 1.

It should be noted that in other embodiments, a bleed valve may be configured differently to reduce noise as air is vented through the bleed valve. For example, with reference to FIG. 8, a bleed valve 300 is shown. As the bleed valve 300 includes components that are the same or similar to components of the bleed valve 200 discussed with regard to FIGS. 1-7, the same reference numerals will be used to denote the same or similar components. In one example, the bleed valve 300 includes a housing 302 and a poppet 304. The poppet 304 is movable relative to the housing 302 to move the bleed valve 300 between a first, opened position, in which air is permitted to flow through the bleed valve 300, and a second, closed position, in which air is inhibited from flowing through the bleed valve 300.

The housing 302 is composed of a metal or metal alloy, including, but not limited to, aluminum, Inconel, titanium, or steel and may be cast, forged, additively manufactured via direct metal laser sintering (DMLS), etc. In one example, the housing 302 is annular, and tapers from the first side 206 to the opposite second side 208. The first side 206 of the housing 302 includes the inlet 210. The inlet 210 is fluidly coupled to the compressor section 104 (FIG. 1) to receive the high pressure air from the compressor section 104 (FIG. 1). The first inlet end 210*a* is positioned within the compressor section 104 (FIG. 1) to receive the high pressure air and the second inlet end 210*b* is in fluid communication with the first side 206 of the housing 302. The second side 208 includes the outlet 212, which is opposite the inlet 210. The outlet 212 is fluidly coupled to the outer bypass duct 116 to exhaust the high pressure air into the outer bypass duct 116.

Figure 9:
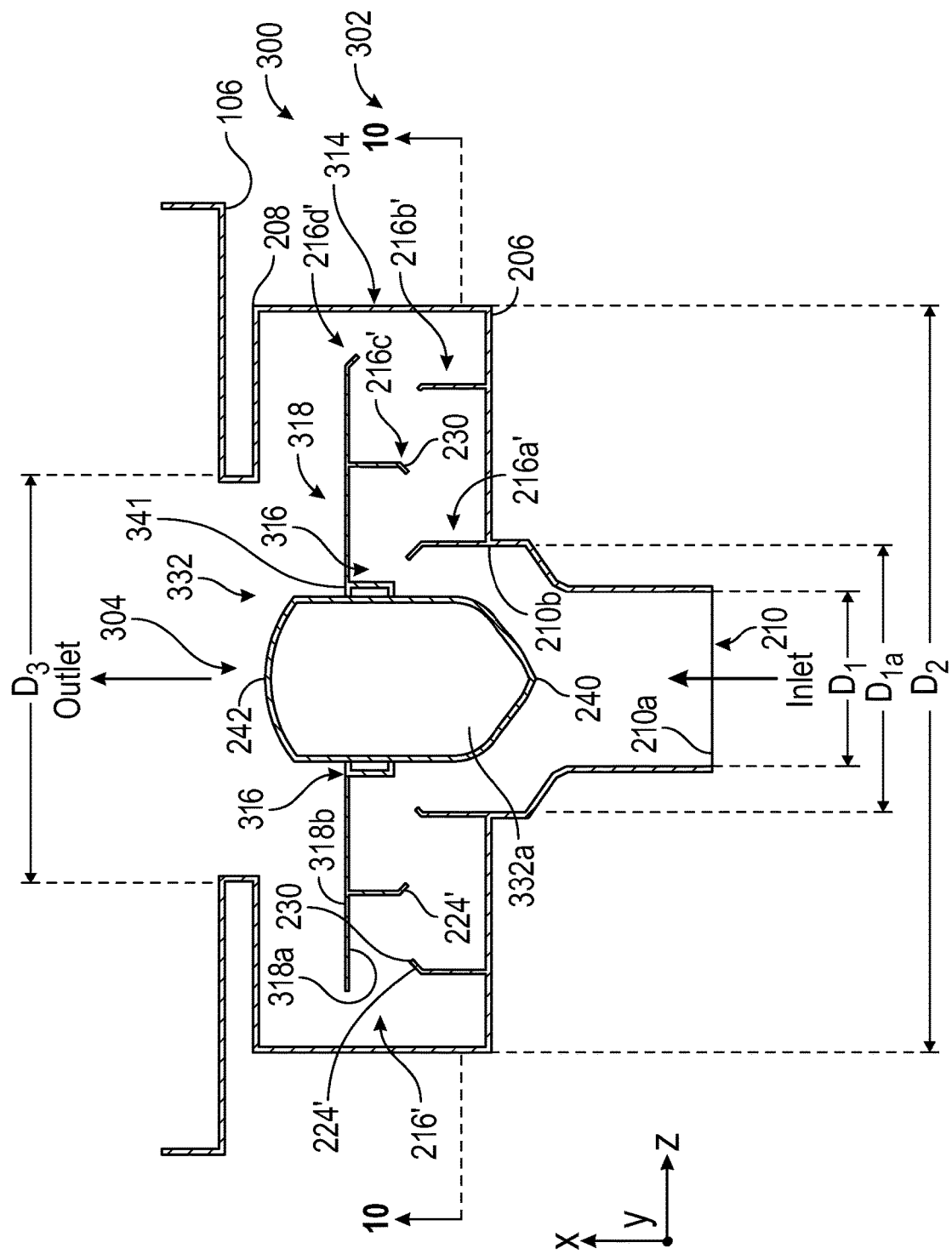
FIG. 9 is a cross-sectional view of the bleed valve of FIG. 8, taken along line 9-9 of FIG. 8.
Figure 10:
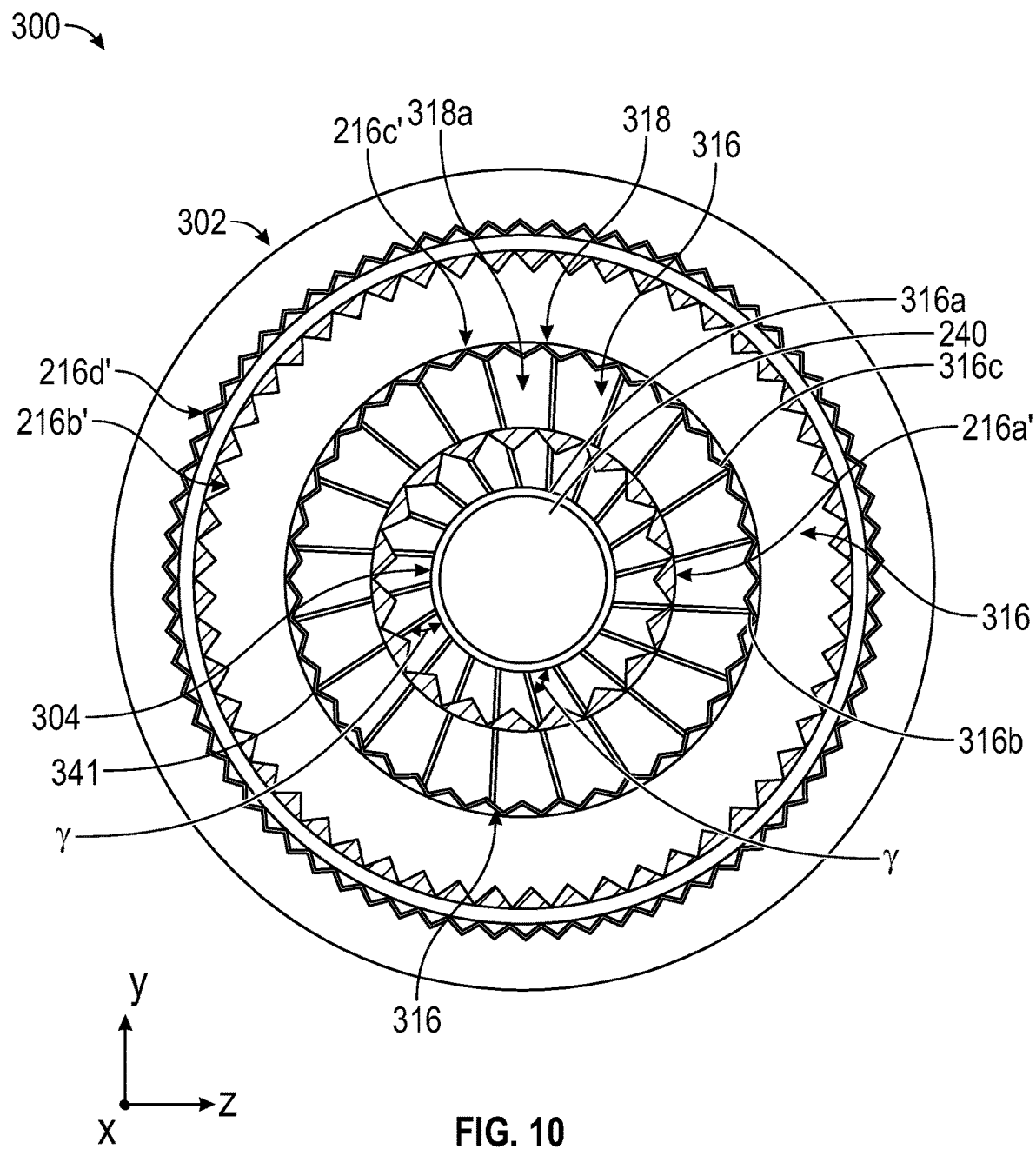
FIG. 10 is a cross-sectional view of the bleed valve of FIG. 8, taken along line 10-10 of FIG. 9.

With reference to FIG. 9, the housing 302 defines a tortuous path 314 from the inlet 210 to the outlet 212, which reduces a pressure of the high pressure fluid to reduce a noise associated with the release of the fluid through the outlet 212. In one example, the housing 302 includes the plurality of rings 216' and at least one or a plurality of vanes 316, which cooperate to define the tortuous path 314. In this example, the housing 302 includes the four rings 216*a'*-216*d'*, which are each concentric with or positioned concentrically about a valve body 332 associated with the poppet 304 (FIG. 10). Each of the rings 216*a'*-216*d'* are spaced apart from each other and cooperate with the vanes 316 to define the tortuous path 314. As discussed previously, each of the rings 216*a'*-216*c'* include the body segment 222 and the terminal segment 224', and the ring 216*d'* includes the terminal segment 224'. The body segment 222 extends from the respective surface 206*a*, 318*a* so as to be substantially perpendicular to the respective surface 206*a*, 318*a*. The terminal segment 224' of the rings 216*a'*-216*c'* extend from the body segment 222 to the terminal end 226', and the terminal segment 224' of the ring 216*d'* extends from the surface 318*a* to the terminal end 226'. Each of the terminal segments 224' of each of the rings 216*a'*-216*d'* also includes the plurality of serrations 230.

In this example, the vanes 316 are turning or swirl vanes, which project outwardly from a surface 318*a* of a central plate 318 associated with the poppet 304. The vanes 316 are downstream of the inlet 210 and are coupled within the housing 302. The central plate 318 is contained wholly within the housing 302. In one example, the central plate 318 is coupled to the housing 302 so as to be fixed relative to the poppet 304, such that the poppet 304 moves relative to and independently of the central plate 318. In this example, the central plate 318 may be suspended by one or more struts that extend between the housing 302 and the central plate 318 as an example. In other embodiments, the central plate 318 may be integrally formed with the poppet 304 so as to move with the poppet 304. The central plate 318 is positioned within the housing 302 between the inlet 210 and the outlet 212. The central plate 218 is annular, and includes the surface 318a, which is opposite a surface 318b. The central plate 318 is concentric with the poppet 304 and defines the bore 241, which enables the poppet 304 to move relative to the central plate 318 to place the bleed valve 300 in the first position, the second position and positions therebetween.

Figure 9A:
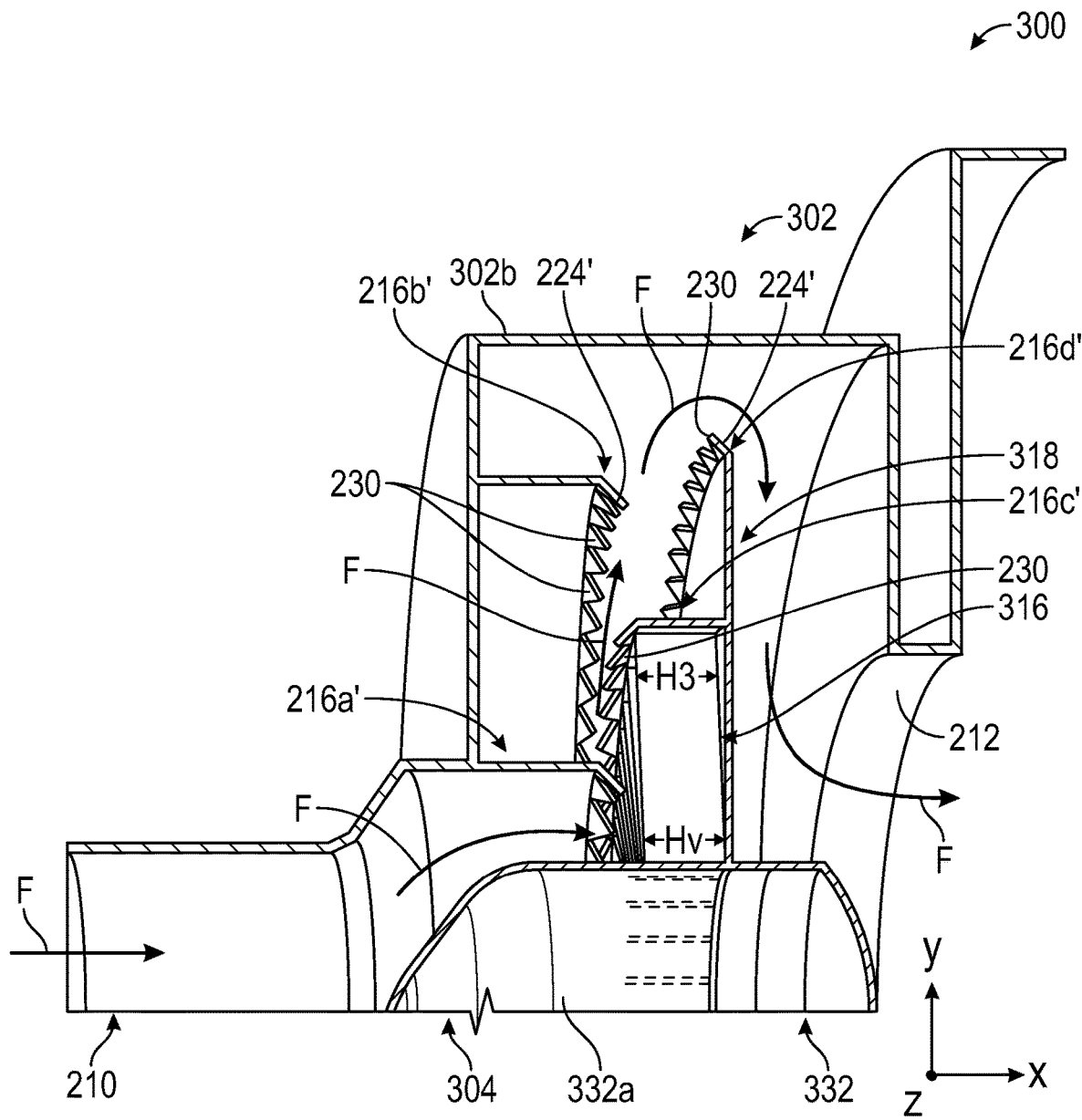
FIG. 9A is a cross-sectional view of the bleed valve of FIG. 8, taken along line 9A-9A of FIG. 8.

With reference to FIG. 10, the vanes 316 are shown in greater detail. In this example, the vanes 316 are spaced apart about a circumference or perimeter of the bore 341 of the central plate 318 so as to be adjacent to the valve body 332 of the poppet 304. Each of the vanes 316 extend from the bore 341 of the central plate 318 to the third ring 216c' at an angle γ. In one example, the angle γ is about 5 degrees to about 15 degrees. By extending at the angle γ, the vanes 316 induce swirl into the air as it flows through the bleed valve 300. Each of the vanes 316 are integrally formed with the central plate 318 with a first vane end 316a proximate to or at the bore 341, and a second vane end 316b proximate to or at the third ring 216c'. With reference to FIG. 9A, each of the vanes 316 has a height Hv, which is different, and in this example, less than the height H3 of the third ring 216c'. With reference back to FIG. 10, the bleed valve 300 may include any number of the vanes 316, from about 10 of the vanes 316 to about 20 of the vanes 316 spaced apart about the circumference of the valve body 332. It should be noted that in certain instances, the vanes 316 may be positioned in groups, such that the vanes 316 are not evenly spaced about the circumference of the valve body 332, if desired. In one example, the vanes 316 reduce max turbulent kinetic energy by about 59%, when compared to the bleed valve 200 having the rings 216a-216d that are devoid of the serrations 230. The reduction in the turbulent kinetic energy reduces the amount of noise generated when the air is bled from the bleed valve 300.

With reference back to FIG. 9, the poppet 304 is generally cylindrical, and in this example, is solid. The poppet 304 includes a valve body 332. The poppet 304 is composed of a metal or metal alloy, including, but not limited to aluminum, Inconel, titanium, or steel and may be cast, forged, machined, stamped, additively manufactured through DMLS, etc. As discussed, the poppet 304 is movable relative to the housing 302 between the first position, in which the poppet 304 closes the inlet 210 and the second position in which the poppet 304 opens the inlet 210. Generally, the poppet 304 is movable to positions between the first position and the second position based on a pressure of the high pressure air received from the compressor section 104 (FIG. 1). Thus, in this example, the pressure of the high pressure air moves the poppet 304 between the first position, the second position and positions in-between. The mass of the poppet 304 may be predetermined such that the poppet 304 moves from the first position at a predefined threshold pressure. In other embodiments, the poppet 304 may be electrically coupled to a controller associated with the gas turbine engine 100 (FIG. 1) and responsive to one or more control signals to move between the first position, the second position and positions in-between.

The valve body 332 includes the first body end 240 opposite the second body end 242. The central plate 318 is coupled to the housing 302 so as to be fixed relative to the poppet 304, such that the poppet 304 moves relative to and independently of the central plate 318. Each of the vanes 316 is coupled to or integrally formed with the surface 318a of the central plate 318 to extend between the bore 341 and the third ring 216c'.

In one example, the housing 302 is formed with the rings 216a', 216c'. The poppet 304 is formed, the central plate 318 is formed with the rings 216c', 216d' and the vanes 316, and positioned within the housing 302. The bleed valve 300 is coupled to the gas turbine engine 100 (FIG. 1) such that the inlet 210 is disposed in and fluidly coupled to the compressor section 104 (FIG. 1). During the operation of the gas turbine engine 100, once the pressure of the air within the compressor section 104 (FIG. 1) exceeds the mass of the poppet 304, the poppet 304 moves from the first position, in which the inlet 210 is closed, towards the second position. In the second position, as the air enters into the bleed valve 300, the air flows through the tortuous path 314 defined by the plurality of rings 216a'-216d' and the vanes 316. As the air flows around the vanes 316, around the terminal segments 224', and through the tortuous path 314, the pressure of the air is reduced, which reduces a noise associated with the air exiting the bleed valve 300 through the outlet 212. Thus, the bleed valve 300, via the plurality of rings 216a'-216d' and the vanes 316 that cooperate to define the tortuous path 314, reduces a noise associated with the bleeding of air from the compressor section 104 (FIG. 1) through the bleed valve 300.

It should be noted that while the bleed valve 300 is illustrated herein as including the plurality of rings 216a'-216d', which include the serrations 230, the bleed valve 300 may include the plurality of rings 216a-216d that are devoid of serrations 230 instead. Thus, while the bleed valve 300 is described and illustrated herein as including both the plurality of rings 216a'-216d' with the serrations 230 and the vanes 316, the bleed valve 300 may include the plurality of rings 216a-216d and the vanes 316. Moreover, the bleed valve 300 may include a combination of the rings 216a-216d and the rings 216a'-216d' along with the vanes 316, if desired.

It should be noted that in other embodiments, a bleed valve may be configured differently to reduce noise as air is vented through the bleed valve. For example, with reference to FIG. 11, a bleed valve 400 is shown. As the bleed valve 400 includes components that are the same or similar to components of the bleed valve 200 discussed with regard to FIGS. 1-7 and the bleed valve 300 discussed with regard to FIGS. 8-10, the same reference numerals will be used to denote the same or similar components. In one example, the bleed valve 400 includes a housing 402 and the poppet 304. The poppet 304 is movable relative to the housing 402 to move the bleed valve 400 between a first, opened position, in which air is permitted to flow through the bleed valve 400, and a second, closed position, in which air is inhibited from flowing through the bleed valve 400.

The housing 402 is composed of a metal or metal alloy, including, but not limited to, aluminum, Inconel, titanium, or steel and may be cast, forged, additively manufactured via direct metal laser sintering (DMLS), etc. In one example, the housing 402 is annular, and tapers from a first side 406 to the opposite second side 208. The first side 406 of the housing 402 includes the inlet 210. The inlet 210 is fluidly coupled to the compressor section 104 (FIG. 1) to receive the high pressure air from the compressor section 104 (FIG. 1). The first inlet end 210a is positioned within the compressor section 104 (FIG. 1) to receive the high pressure air and the second inlet end 210b is in fluid communication with the first side 206 of the housing 402. The second side 208 includes the outlet 212, which is opposite the inlet 210. The outlet 212 is fluidly coupled to the outer bypass duct 116 to exhaust the high pressure air into the outer bypass duct 116.

Figure 12:
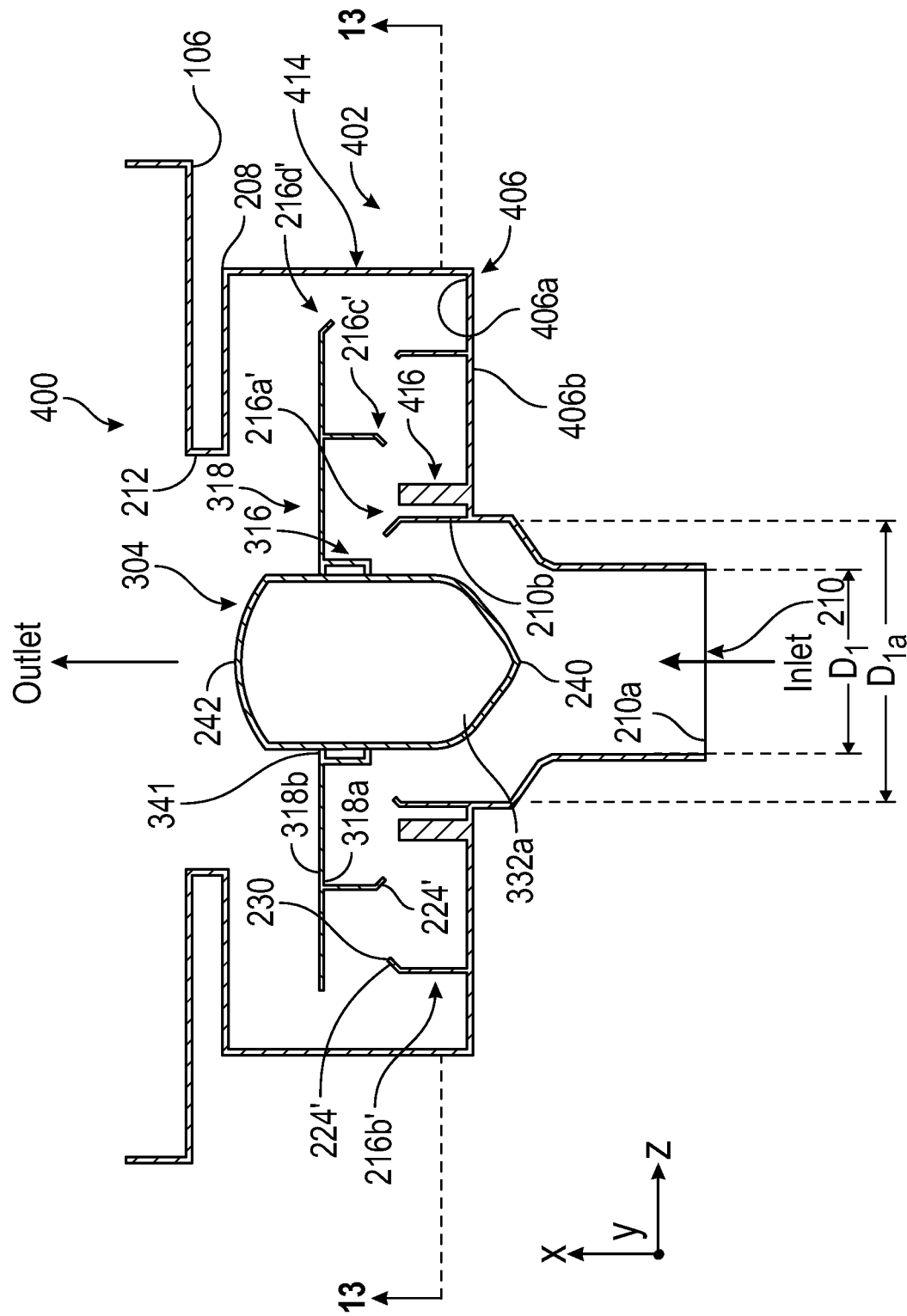
FIG. 12 is a cross-sectional view of the bleed valve of FIG. 11, taken along line 12-12 of FIG. 11.
Figure 13:
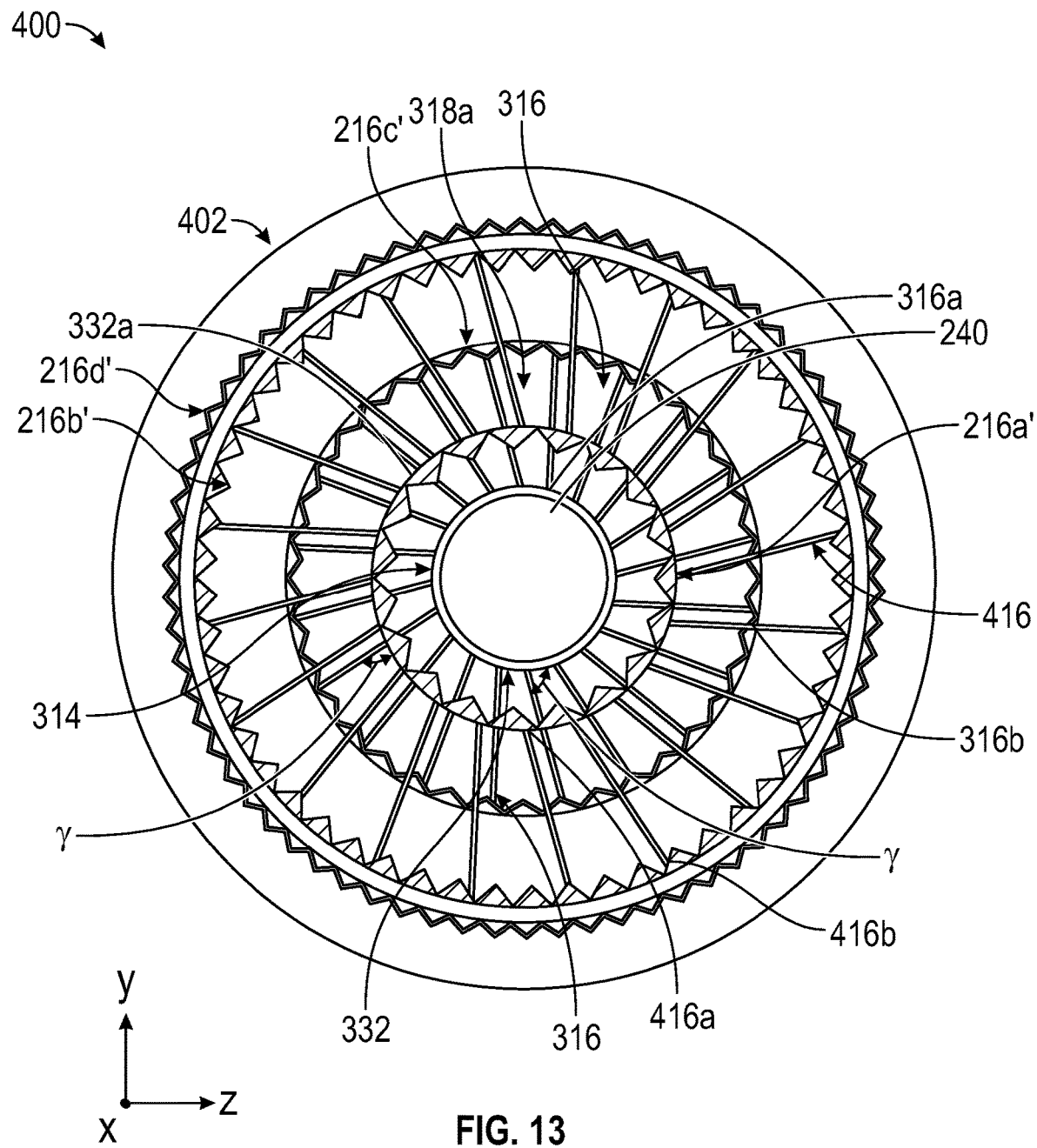
FIG. 13 is a cross-sectional view of the bleed valve of FIG. 11, taken along line 13-13 of FIG. 12.

With reference to FIG. 12, the housing 402 defines a tortuous path 414 from the inlet 210 to the outlet 212, which reduces a pressure in the high pressure fluid to reduce a noise associated with the release of the fluid through the outlet 212. In one example, the housing 402 includes the plurality of rings 216', the plurality of vanes 316 and at least one or a plurality of second vanes 416, which cooperate to define the tortuous path 414. In this example, the housing 402 includes the four rings 216a'-216d', which are each concentric with or positioned concentrically about the valve body 332 associated with the poppet 304 (FIG. 13). Each of the rings 216a'-216d' are spaced apart from each other and cooperate with the vanes 316 and the second vanes 416 to define the tortuous path 414. As discussed previously, each of the rings 216a'-216c' include the body segment 222 and the terminal segment 224', and the ring 216d' includes the terminal segment 224'. The body segment 222 extends from the respective surface 206a, 318a so as to be substantially perpendicular to the respective surface 206a, 318a. The terminal segment 224' of the rings 216a'-216c' extend from the body segment 222 to the terminal end 226', and the terminal segment 224' of the ring 216d' extends from the surface 318a to the terminal end 226'. Each of the terminal segments 224' of each of the rings 216a'-216d' also includes the plurality of serrations 230.

Figure 11:
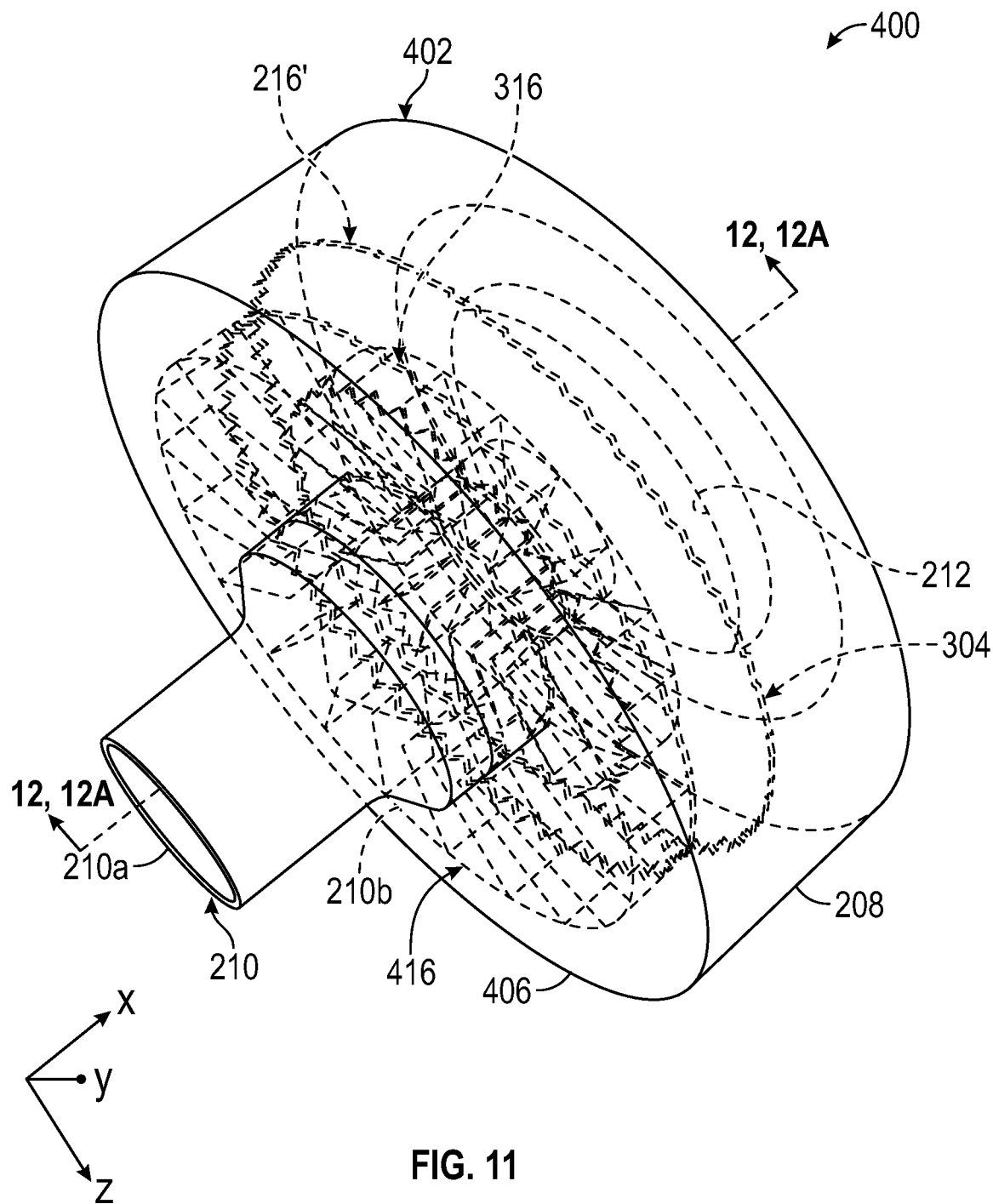
FIG. 11 is a perspective view of another exemplary bleed valve for use with the gas turbine engine of FIG. 1.
Figure 12A:
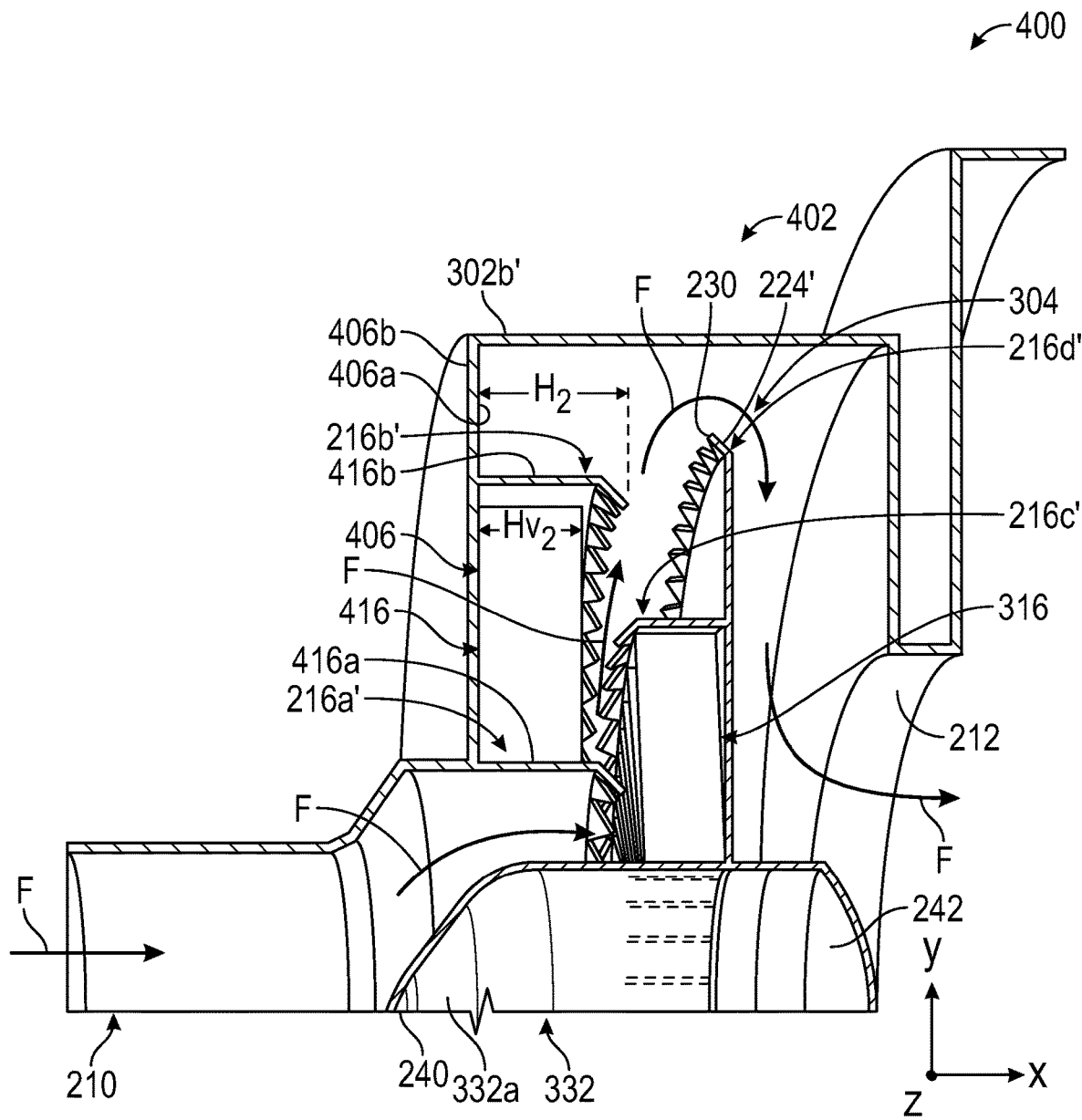
FIG. 12A is a cross-sectional view of the bleed valve of FIG. 11, taken along line 12A-12A of FIG. 11.

With reference to FIG. 13, the vanes 316 are turning or swirl vanes, which project outwardly from the surface 318a of the central plate 318. The vanes 316 are spaced apart about the circumference or perimeter of the bore 341 associated with the central plate 318. Each of the vanes 316 extend from the bore 341 to the third ring 216c' at the angle γ. In this example, the second vanes 416 are also turning or swirl vanes, which project outwardly from a surface 406a of the first side 406 (FIG. 12). The second vanes 416 are downstream of the inlet 210 and are coupled within the housing 402. The second vanes 416 are spaced apart about a circumference or perimeter of the surface 406a of the first side 406 (FIG. 11). Each of the second vanes 416 extend from the first ring 216a' to the second ring 216b' at the angle γ. In one example, the angle γ is about 5 degrees to about 15 degrees. By extending at the angle γ, the second vanes 416 also induce swirl into the air as it flows through the bleed valve 400. Each of the second vanes 416 are integrally formed with or coupled to the first ring 216a' at a first vane end 416a, and are integrally formed with or coupled to the second ring 216b' at a second vane end 416b. With reference to FIG. 12A, each of the second vanes 416 has a height Hv1, which is different, and in this example, less than the height H2 of the second ring 216b'. With reference back to FIG. 13, the bleed valve 400 may include any number of the second vanes 416, from about 10 of the second vanes 416 to about 20 of the second vanes 416 spaced apart about the circumference of the first side 406 (FIG. 12).

With reference back to FIG. 12, the poppet 304 includes the valve body 332. The poppet 304 is movable relative to the housing 302 between the first position, in which the poppet 304 closes the inlet 210 and the second position in which the poppet 304 opens the inlet 210. Generally, as discussed, the poppet 304 is movable to positions between the first position and the second position based on a pressure of the high pressure air received from the compressor section 104 (FIG. 1). The valve body 332 includes the first body end 240 opposite the second body end 242. The valve body 332 is movable relative to the central plate 318 within the bore 341 defined through the central plate 318.

In one example, the housing 402 is formed with the rings 216a', 216c' and the second vanes 416. The poppet 304 is formed, the central plate 318 is formed with the rings 216c', 216d' and the vanes 316, and positioned within the housing 402. The bleed valve 300 is coupled to the gas turbine engine 100 (FIG. 1) such that the inlet 210 is disposed in and fluidly coupled to the compressor section 104 (FIG. 1). During the operation of the gas turbine engine 100, once the pressure of the air within the compressor section 104 (FIG. 1) exceeds the mass of the poppet 304, the poppet 304 moves from the first position, in which the inlet 210 is closed, towards the second position. In the second position, as the air enters into the bleed valve 400, the air flows through the tortuous path 414 defined by the plurality of rings 216a'-216d', the vanes 316 and the second vanes 416. As the air flows around the vanes 316, around the second vanes 416, around the terminal segments 224', and through the tortuous path 414, the pressure of the air is reduced, which reduces a noise associated with the air exiting the bleed valve 400 through the outlet 212. Thus, the bleed valve 400, via the plurality of rings 216a'-216d', the vanes 316 and the second vanes 416 that cooperate to define the tortuous path 414, reduces a noise associated with the bleeding of air from the compressor section 104 (FIG. 1) through the bleed valve 400. In one example, the second vanes 416 reduce max turbulent kinetic energy by about 8%, when compared to the bleed valve 300 having the rings 216a'-216d' and the vanes 316. The reduction in the turbulent kinetic energy reduces the amount of noise generated when the air is bled from the bleed valve 400.

It should be noted that while the bleed valve 400 is illustrated herein as including the plurality of rings 216a'-216d', which include the serrations 230, the bleed valve 400 may include the plurality of rings 216a-216d that are devoid of serrations 230 instead. Thus, while the bleed valve 400 is described and illustrated herein as including both the plurality of rings 216a'-216d' with the serrations 230, the vanes 316 and the second vanes 416, the bleed valve 400 may include the plurality of rings 216a-216d, the vanes 316 and the second vanes 416. Moreover, the bleed valve 400 may include a combination of the rings 216a-216d and the rings 216a'-216d' along with the vanes 316 and the second vanes 416, if desired. Lastly, the bleed valve 400 may include the plurality of rings 216a-216d and/or 216a'-216d' and the second vanes 416, and may not include the vanes 316, if desired.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A bleed valve for a gas turbine engine, comprising:
a housing that defines an inlet upstream from an outlet, the bleed valve including a poppet movable relative to the housing between a first position, in which the poppet closes the inlet, and a second position, in which the inlet is open and configured to receive a fluid flow, the housing defining a tortuous path for the fluid flow from the inlet to the outlet configured to reduce a pressure of the fluid flow from the inlet to the outlet within the housing, the tortuous path defined by a plurality of rings positioned about the poppet, each ring of the plurality of rings spaced apart from an adjacent ring of the plurality of rings between the inlet and the outlet to define the tortuous path, and a first ring and a second ring of the plurality of rings are defined on an interior surface of the housing and face a third ring and a fourth ring of the plurality of rings.

2. The bleed valve of claim 1, wherein each ring of the plurality of rings includes a terminal segment that defines a terminal end, and the terminal segment is angled relative to a direction of fluid flow through the housing.

3. The bleed valve of claim 2, wherein the terminal segment includes a plurality of serrations.

4. The bleed valve of claim 1, further comprising at least one swirl vane coupled within the housing downstream of the inlet, the at least one swirl vane coupled within the housing at an angle relative to a central axis that extends through the housing.

5. The bleed valve of claim 4, wherein the at least one swirl vane is coupled between a valve body associated with the poppet and a first ring of the plurality of rings.

6. The bleed valve of claim 4, further comprising at least one second swirl vane coupled within the housing downstream of the inlet, the at least one second swirl vane coupled within the housing at the angle relative to the central axis that extends through the housing.

7. The bleed valve of claim 6, wherein the at least one second swirl vane is coupled between a third ring and a fourth ring of the plurality of rings.

8. The bleed valve of claim 1, wherein each ring of the plurality of rings is positioned concentrically about a valve body associated with the poppet.

9. The bleed valve of claim 1, further comprising a central plate defining a bore, the third ring and the fourth ring of the plurality of rings are defined on the central plate and the poppet includes a valve body that is movable relative to the bore.

10. The bleed valve of claim 9, further comprising at least one swirl vane defined on the central plate between the bore and the third ring.

11. The bleed valve of claim 9, further comprising at least one second swirl vane defined between the first ring and the second ring.

12. A bleed valve for a gas turbine engine, comprising:
a housing that defines an inlet upstream from an outlet, the bleed valve including a poppet movable relative to the housing between a first position, in which the poppet closes the inlet, and a second position, in which the inlet is open and configured to receive a fluid flow, the housing defining a tortuous path for the fluid flow from the inlet to the outlet configured to reduce a pressure of the fluid flow from the inlet to the outlet within the housing, the tortuous path defined by a plurality of rings positioned about the poppet, each ring of the plurality of rings spaced apart from an adjacent ring of the plurality of rings between the inlet and the outlet to define the tortuous path, a first ring and a second ring of the plurality of rings are defined on an interior surface of the housing and face a third ring and a fourth ring of the plurality of rings, each ring of the plurality of rings has a terminal segment that defines a terminal end and the terminal segment is angled in a direction of fluid flow through the housing.

13. The bleed valve of claim 12, wherein the terminal segment includes a plurality of serrations.

14. The bleed valve of claim 12, wherein each ring of the plurality of rings is positioned concentrically about a valve body associated with the poppet.

15. The bleed valve of claim 12, further comprising a central plate defining a bore, the third ring and the fourth ring of the plurality of rings are defined on the central plate and the poppet includes a valve body that is movable relative to the bore.

16. The bleed valve of claim 15, further comprising at least one swirl vane defined on the central plate between the bore and the third ring.

17. The bleed valve of claim 16, further comprising at least one second swirl vane defined between the first ring and the second ring.

18. The bleed valve of claim 17, wherein the at least one swirl vane and the at least one second swirl vane extend at an angle relative to the valve body.

* * * * *